(12) United States Patent
Schwendimann et al.

(10) Patent No.: US 12,412,130 B1
(45) Date of Patent: Sep. 9, 2025

(54) ARRANGING TOUR TRIPS USING AUTONOMOUS VEHICLES

(71) Applicant: Waymo LLC, Mountain View, CA (US)

(72) Inventors: Lauren Schwendimann, Burlingame, CA (US); Kevin Malta, San Francisco, CA (US); Victor Chan, Mountain View, CA (US); Kyle Bechtel, San Mateo, CA (US); Philip Moltmann, Menlo Park, CA (US); Reed Morse, Millbrae, CA (US)

(73) Assignee: Waymo LLC, Mountain View, CA (US)

(*) Notice: Subject to any disclaimer, the term of this patent is extended or adjusted under 35 U.S.C. 154(b) by 116 days.

(21) Appl. No.: 17/673,418

(22) Filed: Feb. 16, 2022

(51) Int. Cl.
| | |
|---|---|
| G06Q 10/02 | (2012.01) |
| B60W 60/00 | (2020.01) |
| G01C 21/34 | (2006.01) |
| G01C 21/36 | (2006.01) |
| G06Q 50/14 | (2012.01) |
| G06Q 50/40 | (2024.01) |

(52) U.S. Cl.
CPC ..... *G06Q 10/025* (2013.01); *B60W 60/00139* (2020.02); *B60W 60/00253* (2020.02); *G01C 21/343* (2013.01); *G01C 21/3476* (2013.01); *G01C 21/3673* (2013.01); *G06Q 10/02* (2013.01); *G06Q 50/14* (2013.01); *G06Q 50/40* (2024.01)

(58) Field of Classification Search
None
See application file for complete search history.

(56) References Cited

U.S. PATENT DOCUMENTS

| | | | |
|---|---|---|---|
| 5,802,492 A * | 9/1998 | DeLorme | G09B 29/106 340/995.23 |
| 6,691,026 B2 | 2/2004 | Odinak et al. | |
| 10,591,309 B2* | 3/2020 | Kline | G06F 3/0482 |
| 10,718,622 B2 | 7/2020 | Colijn et al. | |
| 11,868,395 B1* | 1/2024 | Bernstein | G06F 16/51 |
| 2005/0021227 A1* | 1/2005 | Matsumoto | G01C 21/3415 701/431 |

(Continued)

OTHER PUBLICATIONS

Cohen, Scott A. et al.; "Autonomous vehicles and the future of urban tourism"; Available online Nov. 1, 2018; Annals of Tourism Research; vol. 74; journal pp. 33-42, attachment pp. 1-10 (Year: 2018).*

*Primary Examiner* — Resha Desai
*Assistant Examiner* — Michael C Moroney
(74) *Attorney, Agent, or Firm* — Botos Churchill IP Law

(57) ABSTRACT

Aspects of the disclosure provide for arranging tour trips. For instance, a request identifying a pickup location for a tour trip may be received from a client computing device. A set of tours may be selected from a plurality of pre-stored tours based on the pickup location. Each of the plurality of pre-stored tours may include tour locations. The set of tours may be provided to the client computing device for display. Information identifying one of the set of tours may be received from the client computing device. Instructions may be provided to an autonomous vehicle to cause the autonomous vehicle to complete the tour trip by maneuvering to the pickup location and thereafter visit one or more tour locations included in the identified one of the set of tours.

18 Claims, 15 Drawing Sheets

(56) References Cited

U.S. PATENT DOCUMENTS

| | | | |
|---|---|---|---|
| 2010/0198498 A1* | 8/2010 | Jansen | G01C 21/26 |
| | | | 701/533 |
| 2012/0036467 A1* | 2/2012 | Tom | G06Q 10/047 |
| | | | 715/772 |
| 2012/0143882 A1* | 6/2012 | Zheng | G06Q 10/08 |
| | | | 707/E17.069 |
| 2014/0365113 A1* | 12/2014 | McGavran | G01C 21/3661 |
| | | | 701/538 |
| 2015/0066356 A1* | 3/2015 | Kirsch | G01C 21/3664 |
| | | | 701/538 |
| 2016/0003621 A1* | 1/2016 | Koenig | G07C 5/008 |
| 2016/0171011 A1* | 6/2016 | Drogobetski | G06F 3/04842 |
| | | | 707/722 |
| 2016/0247098 A1* | 8/2016 | Bongiorno | G06Q 10/025 |
| 2016/0298974 A1* | 10/2016 | Newlin | G08G 1/0141 |
| 2017/0046802 A1* | 2/2017 | Zhang | G06Q 50/01 |
| 2017/0059337 A1* | 3/2017 | Barker | G06Q 10/047 |
| 2017/0061024 A1* | 3/2017 | Tsuboi | H04L 67/52 |
| 2017/0091883 A1* | 3/2017 | Greystoke | G06Q 50/14 |
| 2017/0249847 A1* | 8/2017 | Marueli | G06Q 10/06311 |
| 2017/0314939 A1* | 11/2017 | Carter | G01C 21/3492 |
| 2018/0372505 A1* | 12/2018 | Frederick | G01C 21/343 |
| 2019/0086223 A1* | 3/2019 | Tanaka | G06F 16/00 |
| 2019/0195639 A1* | 6/2019 | Malewicz | G01C 21/3673 |
| 2019/0301879 A1* | 10/2019 | Gusikhin | G01C 21/3484 |
| 2020/0134561 A1* | 4/2020 | Hedges | G05D 1/0274 |
| 2020/0160264 A1* | 5/2020 | Silverman | G06Q 10/08355 |
| 2020/0193335 A1* | 6/2020 | Sekhar | G06Q 10/025 |
| 2020/0200556 A1* | 6/2020 | Boston | G01C 21/3644 |
| 2021/0097893 A1* | 4/2021 | Klappert | G06F 16/9024 |
| 2021/0350702 A1* | 11/2021 | Nilsson | G08G 1/146 |
| 2022/0065633 A1* | 3/2022 | Beaurepaire | G01C 21/343 |
| 2022/0076173 A1* | 3/2022 | Anyaoha | G06Q 10/025 |
| 2022/0390242 A1* | 12/2022 | Andrich | H04M 1/72457 |

* cited by examiner

ARRANGING TOUR TRIPS USING AUTONOMOUS VEHICLES

BACKGROUND

Autonomous vehicles for instance, vehicles that may not require a human driver, can be used to aid in the transport of passengers or items from one location to another. Such vehicles may operate in a fully autonomous mode where passengers may provide some initial input, such as a pickup or destination location, and the autonomous vehicle maneuvers itself to that location. Autonomous vehicles are equipped with various types of sensors in order to detect objects in the surroundings. For example, autonomous vehicles may include sonar, radar, camera, lidar, and other devices that scan, generate and/or record data about the vehicle's surroundings in order to enable the autonomous vehicle to plan trajectories in order to maneuver itself through the surroundings.

BRIEF SUMMARY

Aspects of the disclosure provide a method of arranging tour trips. The method includes receiving, by one or more processors, a request from a client computing device, the request identifying a pickup location for a tour trip; selecting, by the one or more processors, a set of tours from a plurality of pre-stored tours based on the pickup location, each of the plurality of pre-stored tours including tour locations; providing, by the one or more processors, the set of tours to the client computing device for display to a user; receiving, by the one or more processors, from the client computing device, information identifying one of the set of tours; and providing, by the one or more processors, instructions to an autonomous vehicle to cause the autonomous vehicle to complete the tour trip by maneuvering to the pickup location and thereafter visit one or more tour locations included in the identified one of the set of tours.

In one example, the one or more tour locations include a first stopping location where the autonomous vehicle will stop to allow a passenger to exit the autonomous vehicle and thereafter return to the autonomous vehicle to complete the tour trip. In another example, the one or more tour locations include a second non-stopping location by or through which the autonomous vehicle will drive during the tour trip without stopping. In another example, each of the plurality of tours is further associated with one or more interest labels, and the method further comprises, receiving information identifying one or more interests, and selecting the set of tours is further based on the one or more interests and the one or more interest labels associated with each of the tours of the set of tours. In another example, at least some of the plurality of tours are further associated with information identifying when such tours can be taken, and selecting the set of tours is further based on the information identifying when such tours can be taken. In one example, the method also includes determining a route and order of tour locations for each given tour of the set of tours based on the pickup location and the tour locations associated with that given tour and providing the route and order of tour locations for the identified one of the set of tours to the autonomous vehicle. In this example, the method also includes receiving information identifying an edit to a given one of the tours of the set of tours, determining an updated route for the given one of the set of tours, and providing the updated route to the client computing device for display to the user.

In another example, the method also includes, determining a route for a given tour of the plurality of tours based on the pickup location and the tour locations associated with the given tour; and excluding the given tour from the set of tours based on characteristics of the route. In another example, the method also includes determining a route for each given tour of the set of tours based on the pickup location and the tour locations associated with the given tour, estimating a total trip length for each given tour based on the route for that given tour and an estimate of how long a passenger is likely to spend at each tour location included in the given tour, and providing the estimated total trip lengths to the client computing device for display to the user. In another example, each of the plurality of tours is further associated with an interest label, and the method further includes providing the interest labels associated with the tours of the set of tours to the client computing device for display to the user. In another example, the method also includes receiving, by the one or more processors, from the client computing device, information identifying an edit to the identified one of the tours of the set of tours, and providing the instructions to an autonomous vehicle includes providing a subset of the tour locations of the identified one of the set of tours to the autonomous vehicle. In another example, the method also includes receiving feedback about the tour trip, and adjusting a characteristic of one or more tours of the plurality of tours based on the feedback. In another example, the instructions to the autonomous vehicle further cause the autonomous vehicle to enable certain features during the tour trip including notifications or cues to a passenger to suggest where to look to see a tour location included in the identified one of the set of tours.

Another aspect of the disclosure provides a method of arranging tour trips. The method includes sending, by one or more processors, a request from a computing device of an autonomous vehicle for a tour trip; receiving, by the one or more processors, a set of tours from a plurality of pre-stored tours based on the pickup location, each of the plurality of pre-stored tours including tour locations; providing, by the one or more processors, the set of tours for display to a user within the autonomous vehicle; receiving, by the one or more processors, user input identifying one of the set of tours; and controlling, by the one or more processors, the autonomous vehicle in order to complete the tour trip by maneuvering the autonomous vehicle to the pickup location and thereafter visit one or more tour locations included in the identified one of the set of tours.

In this example, the one or more tour locations include a first stopping location where the autonomous vehicle will stop to allow a passenger to exit the autonomous vehicle and thereafter return to the autonomous vehicle to complete the tour trip. In another example, the one or more tour locations include a second non-stopping location by or through which the autonomous vehicle will drive during the tour trip without stopping. In another example, the method also includes receiving information identifying an edit to a given one of the tours of the set of tours, determining a route for the given one of the tours of the set of tours, and providing the route for display to the user. In another example, each of the plurality of tours is further associated with an interest label, and the method further comprises providing the interest labels associated with the tours of the set of tours to for display to the user. In another example, the method also includes receiving information identifying an edit to the identified one of the set of tours, and controlling, by the one or more processors, the autonomous vehicle in order to complete the tour trip includes controlling the autonomous vehicle in order to visit a subset of the tour locations of the identified one of the set of tours to the autonomous vehicle. In another example, the method also includes enabling certain features during the tour trip including notifications or cues to a passenger to suggest where to look to see a tour location included in the identified one of the set of tours.

DETAILED DESCRIPTION

Overview

Figure 1:
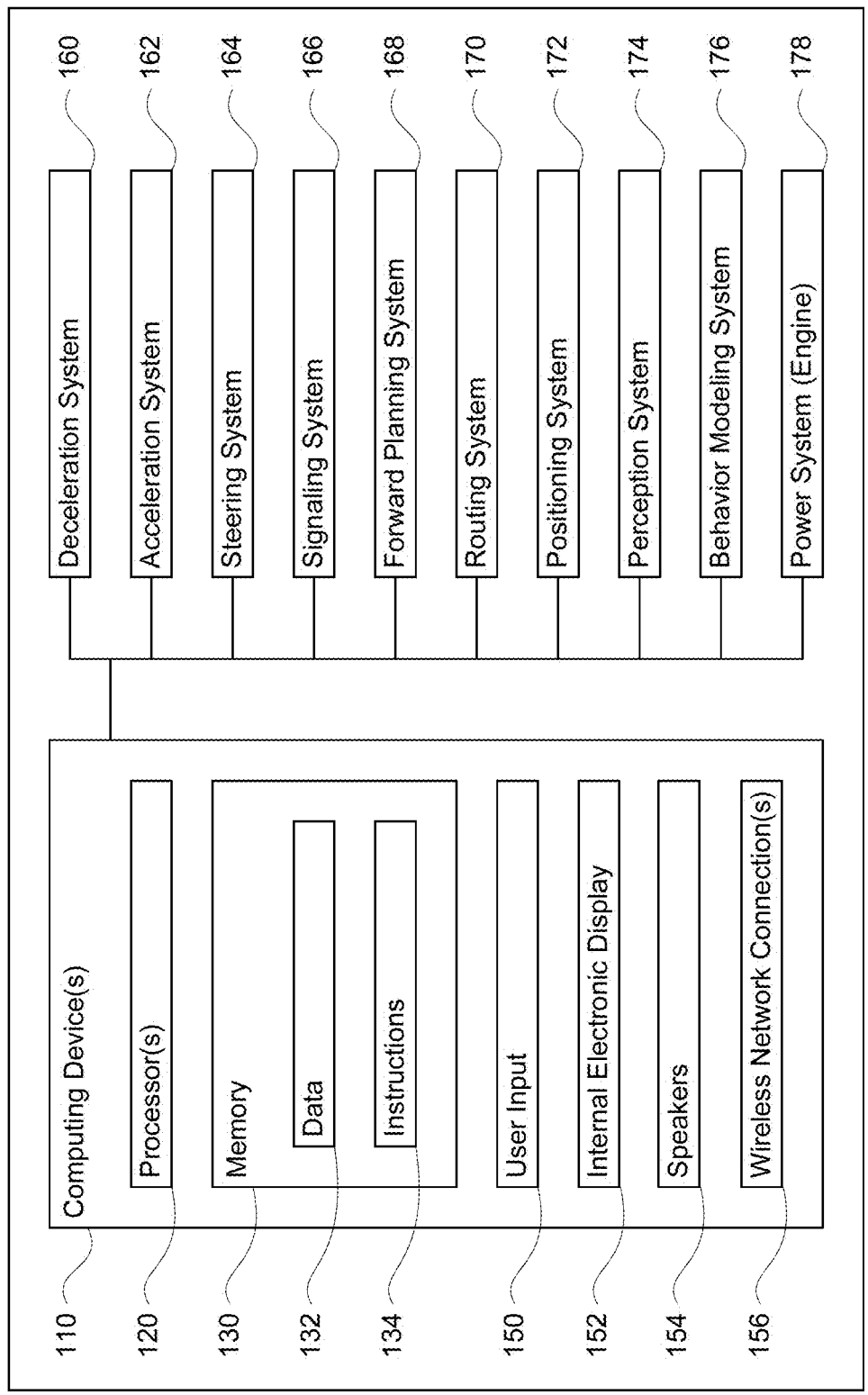
FIG. 1 is a functional diagram of an example vehicle in accordance with an exemplary embodiment.

The technology relates to providing users (e.g. riders or passengers of autonomous vehicles) with personalized tours using an autonomous vehicle transportation service. Typical tour options include buses or other transportation options which can be crowded, inflexible and uncomfortable. However, by utilizing autonomous vehicles of a transportation service, users may be provided with a customized and potentially more comfortable option for touring a location.

In order to do so, a server computing device may have access to a plurality of pre-stored and pre-defined tours. Each such tour may include a plurality of tour locations. For instance, a tour may be manually created by an operator hand-selecting from a plurality of locations within a service area of the transportation service. At least some of these tour locations may be stopping locations, that is, locations where the autonomous vehicle may stop to provide the passenger with the opportunity to exit the autonomous vehicle and explore the tour location and/or the area around the tour location. Thereafter, the passenger may return to the autonomous vehicle and continue the trip ("tour trip"). Other locations may be non-stopping locations or locations by or through which the autonomous vehicle will drive during a tour trip. In some instances, each of the tours may be assigned one or more interest labels or tags as discussed further below.

To arrange a tour trip, a user may first use a client computing device to arrange a tour trip. For instance, the user may access an application of the transportation service and view an option to arrange a tour trip. In response, the client computing device may send a request to a server computing device identifying at least a pickup location (e.g. a current location of the client computing device) and in some instances a different drop off destination. In some instances, the pickup location may be used as a default drop off location for the tour trip. In regard, if the user does not provide a different drop off destination, the server computing devices may simply identify the pickup location as a final destination for the tour trip. The server computing devices may use the pickup location to provide a list of tours having tour locations that are proximate to the pickup location (e.g. within the same city, county, state, etc.).

In some instances, the user may select one or more of a plurality of pre-defined interests. In some instances, the user need not select interests at the time a tour trip is arranged, but rather in advance. This information may also be provided to the server computing devices with the request and may be used by the server computing devices with the pickup location to select one or more tours for the set having the same or similar interest labels.

In some instances, the tours may be associated with information identifying when the tours can be taken. For instance, some tours may be less desirable at certain times of the day, while other tours may not be appropriate due to the time of year, other tours may not be appropriate during certain times of day or days of the week. In this regard, the server computing devices may not suggest such tours during those seasons/days/times.

In some instances, the server computing devices may also use a routing system to plan a route using the tour locations, the pickup location, and the drop off location. In this regard, the server computing devices may discard certain tours or not include them in the set of tours if those tours would be too long or due to current or expected traffic conditions. In this regard, the routing may enable the server computing devices to identify a suggested order of the tour locations using known planning algorithms to determine a fastest route or a route with other desired characteristics.

In addition, the server computing devices may use the route to estimate how long a tour trip may be expected to take or a tour trip length. This may be supplemented with estimates for how long it may take a person to reach a tour location from a stopping location of the vehicle and/or information about how long people typically spend at certain of the tour locations.

The server computing devices may identify a set of the tours using one or more of the features described above and may send each of the tours of the set to the client computing device. In this regard, the server computing devices may also provide information identifying each of the tour locations of the tours of the set of tours. If available, the server computing devices may also provide the route for each tour to the client computing device, an order of the tour locations, and/or tour length.

The set of tours may be displayed to the user in order to enable the user to browse available tours. In this regard, the user may be able to view a list of the tour locations and if received, a route for an associated tour trip, order of tour locations, and an estimated tour trip length. The server computing devices may also provide additional information about the tours, for instance by providing the aforementioned labels. In this regard, certain information such as whether a tour includes a lot of walking, a little bit of walking or no walking may be displayed to the users. The interface may also allow users to sort or reorder available tours based on cost, category (e.g. labels), length of time spent in an autonomous vehicle, length of time expected to be spent at tour locations, or overall tour length.

Once the user has selected a tour, this may cause the client computing device to send information to the server computing devices identifying the tour. In response, the server computing devices may select an available autonomous vehicle and send dispatching instructions to that autonomous vehicle. The dispatching instructions may include the tour locations of the selected tour as well as information identifying whether each of the tour locations is a stopping location or a non-stopping location.

The autonomous vehicle may then control itself to complete the tour trip. This may include stopping to pick up the user (now a passenger), driving to and/or stop at each of the tour locations, and returning the passenger to the pickup location or other final destination. If the autonomous vehicle stops at one or more of the tour locations, the passenger may be provided with the opportunity to exit the autonomous vehicle and explore the tour location and/or the area around the tour location. Thereafter, the passenger may return to the autonomous vehicle and continue the tour trip.

The features described herein may provide users (e.g. riders or passengers of autonomous vehicles) with personalized tours using an autonomous vehicle transportation service. However, by utilizing autonomous vehicles of a transportation service, users may be provided with a customized and potentially more comfortable option for touring a location. In addition, tour trips as described herein can be arranged on demand without any need for scheduling ahead of time or on a fixed schedule like most traditional tours.

Example Systems

As shown in FIG. 1, an autonomous vehicle 100 in accordance with one aspect of the disclosure includes various components. Vehicles, such as those described herein, may be configured to operate in one or more different driving modes. For instance, in a manual driving mode, a driver may directly control acceleration, deceleration, and steering via inputs such as an accelerator pedal, a brake pedal, a steering wheel, etc. An autonomous vehicle may also operate in one or more autonomous driving modes including, for example, a semi or partially autonomous driving mode in which a person exercises some amount of direct or remote control over driving operations, or a fully autonomous driving mode in which the vehicle handles the driving operations without direct or remote control by a person. These vehicles may be known by different names including, for example, autonomously driven vehicles, self-driving vehicles, and so on.

The U.S. National Highway Traffic Safety Administration (NHTSA) and the Society of Automotive Engineers (SAE) have each identified different levels to indicate how much, or how little, a vehicle controls the driving, although different organizations may categorize the levels differently. Moreover, such classifications may change (e.g., be updated) overtime.

As described herein, in a semi or partially autonomous driving mode, even though the vehicle assists with one or more driving operations (e.g., steering, braking and/or accelerating to perform lane centering, adaptive cruise control or emergency braking), the human driver is expected to be situationally aware of the vehicle's surroundings and supervise the assisted driving operations. Here, even though the vehicle may perform all driving tasks in certain situations, the human driver is expected to be responsible for taking control as needed.

In contrast, in a fully autonomous driving mode, the control system of the vehicle performs all driving tasks and monitors the driving environment. This may be limited to certain situations such as operating in a particular service region or under certain time or environmental restrictions, or may encompass driving under all conditions without limitation. In a fully autonomous driving mode, a person is not expected to take over control of any driving operation.

Unless indicated otherwise, the architectures, components, systems and methods described herein can function in a semi or partially autonomous driving mode, or a fully-autonomous driving mode.

While certain aspects of the disclosure are particularly useful in connection with specific types of vehicles, the vehicle may be any type of vehicle including, but not limited to, cars, trucks (e.g. garbage trucks, tractor-trailers, pickup trucks, etc.), motorcycles, buses, recreational vehicles, street cleaning or sweeping vehicles, etc. The vehicle may have one or more computing devices, such as computing device 110 containing one or more processors 120, memory 130 and other components typically present in general purpose computing devices.

The memory 130 stores information accessible by the one or more processors 120, including data 132 and instructions 134 that may be executed or otherwise used by the processor 120. The memory 130 may be of any type capable of storing information accessible by the processor, including a computing device or computer-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 134 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 132 may be retrieved, stored or modified by processor 120 in accordance with the instructions 134. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processors 120 may be any conventional processors, such as commercially available CPUs or GPUs. Alternatively, the one or more processors may include a dedicated device such as an ASIC or other hardware-based processor. Although FIG. 1 functionally illustrates the processor, memory, and other elements of computing device 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing device 110. Accordingly, references to a processor or computing device will be understood to include references to a collection of processors or computing devices or memories that may or may not operate in parallel.

Computing devices 110 may include all of the components normally used in connection with a computing device such as the processor and memory described above as well as a user input 150 (e.g., one or more of a button, mouse, keyboard, touch screen and/or microphone), various electronic displays (e.g., a monitor having a screen or any other electrical device that is operable to display information), and speakers 154 to provide information to a passenger of the autonomous vehicle 100 or others as needed. For example, internal display 152 may be located within a cabin of autonomous vehicle 100 and may be used by computing devices 110 to provide information to passengers within the autonomous vehicle 100.

Computing devices 110 may also include one or more wireless network connections 156 to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

Computing devices 110 may be part of an autonomous control system for the autonomous vehicle 100 and may be capable of communicating with various components of the vehicle in order to control the vehicle in an autonomous driving mode. For example, returning to FIG. 1, computing devices 110 may be in communication with various systems of autonomous vehicle 100, such as deceleration system 160, acceleration system 162, steering system 164, signaling system 166, planning system 168, routing system 170, positioning system 172, perception system 174, behavior modeling system 176, and power system 178 in order to control the movement, speed, etc. of autonomous vehicle 100 in accordance with the instructions 134 of memory 130 in the autonomous driving mode.

As an example, computing devices 110 may interact with deceleration system 160 and acceleration system 162 in order to control the speed of the vehicle. Similarly, steering system 164 may be used by computing devices 110 in order to control the direction of autonomous vehicle 100. For example, if autonomous vehicle 100 is configured for use on a road, such as a car or truck, steering system 164 may include components to control the angle of wheels to turn the vehicle. Computing devices 110 may also use the signaling system 166 in order to signal the vehicle's intent to other drivers or vehicles, for example, by lighting turn signals or brake lights when needed.

Routing system 170 may be used by computing devices 110 in order to generate a route to a destination location using map information. Planning system 168 may be used by computing device 110 in order to generate short-term trajectories that allow the vehicle to follow routes generated by the routing system. In this regard, the planning system 168 and/or routing system 166 may store detailed map information, e.g., pre-stored, highly detailed maps identifying a road network including the shape and elevation of roadways, lane lines, intersections, crosswalks, speed limits, traffic signals, buildings, signs, real time traffic information (updated as received from a remote computing device), pullover spots, vegetation, or other such objects and information.

Figure 2:
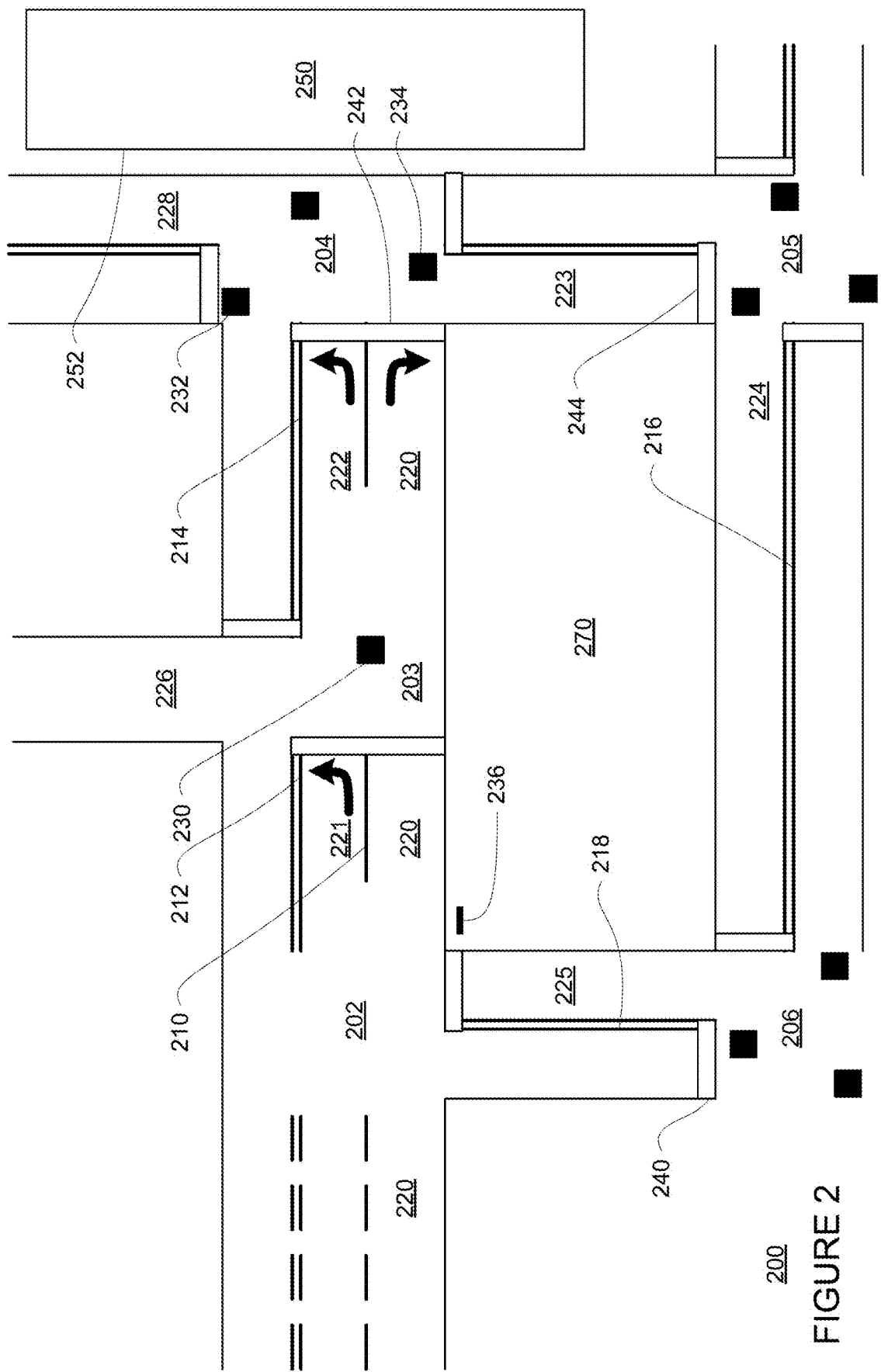
FIG. 2 is an example of map information in accordance with aspects of the disclosure.

FIG. 2 is an example of map information 200 for a small section of roadway including intersections 202, 203, 204, 205, 206. FIG. 2 depicts a portion of the map information 200 that includes information identifying the shape, location, and other characteristics of lane markers or lane lines 210, 212, 214, 216, 218, lanes 220, 221, 222, 223, 224, 225, 226, 228, traffic control devices including traffic signal lights 230, 232, 234 and stop sign 236, stop lines 240, 242, 244, as well as a non-drivable area 270. In this example, lane 221 approaching intersection 203 is a left turn only lane, lane 222 approaching intersection 204 is a left turn only lane, and lane 226 is a one-way street where the direction of traffic moves away from intersection 203. In this example, the map information 200 also identifies a footprint 252 of a building 250. Although shown in two dimensions, the footprint may also be a three-dimensional area occupied by the building. This may also be associated with additional information identifying a classification or type of the building and/or a number of stories, floors or levels. For example, building 250 may be a retail business with two stories. In addition to the aforementioned features and information, the map information may also include information that identifies the direction of traffic for each lane as well as information that allows the computing devices 110 to determine whether the vehicle has the right of way to complete a particular maneuver (i.e. complete a turn or cross a lane of traffic or intersection).

The map information may be configured as a roadgraph. The roadgraph may include a plurality of graph nodes and edges representing features such as crosswalks, traffic lights, road signs, road or lane segments, etc., that together make up the road network of the map information. Each edge is defined by a starting graph node having a specific geographic location (e.g. latitude, longitude, altitude, etc.), an ending graph node having a specific geographic location (e.g. latitude, longitude, altitude, etc.), and a direction. This direction may refer to a direction the autonomous vehicle 100 must be moving in in order to follow the edge (i.e. a direction of traffic flow). The graph nodes may be located at fixed or variable distances. For instance, the spacing of the graph nodes may range from a few centimeters to a few meters and may correspond to the speed limit of a road on which the graph node is located. In this regard, greater speeds may correspond to greater distances between graph nodes. The edges may represent driving along the same lane or changing lanes. Each node and edge may have a unique identifier, such as a latitude and longitude location of the node or starting and ending locations or nodes of an edge. In addition to nodes and edges, the map may identify additional information such as types of maneuvers required at different edges as well as which lanes are drivable.

The routing system 170 may use the aforementioned map information to determine a route from a current location (e.g. a location of a current node) to a destination location. Routes may be generated using a cost-based analysis which attempts to select a route to the destination location with the lowest cost. Costs may be assessed in any number of ways such as time to the destination location, distance traveled (each edge may be associated with a cost to traverse that edge), types of maneuvers required, convenience to passengers or the vehicle, etc. Each route may include a list of a plurality of nodes and edges which the vehicle can use to reach the destination location. Routes may be recomputed periodically as the vehicle travels to the destination location.

The map information used for routing may be the same or a different map as that used for planning trajectories. For example, the map information used for planning routes not only requires information on individual lanes, but also the nature of lane boundaries (e.g., solid white, dash white, solid yellow, etc.) to determine where lane changes are allowed. However, unlike the map used for planning trajectories, the map information used for routing need not include other details such as the locations of crosswalks, traffic lights, stop signs, etc., though some of this information may be useful for routing purposes. For example, between a route with a large number of intersections with traffic controls (such as stop signs or traffic signal lights) versus one with no or very few traffic controls, the latter route may have a lower cost (e.g. because it is faster) and therefore be preferable.

Positioning system 172 may be used by computing devices 110 in order to determine the vehicle's relative or absolute position on a map or on the earth. For example, the positioning system 172 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude, a location of a node or edge of the roadgraph as well as relative location information, such as location relative to other cars immediately around it, which can often be determined with less noise than the absolute geographical location.

The positioning system 172 may also include other devices in communication with computing devices 110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing device 110, other computing devices and combinations of the foregoing.

The perception system 174 also includes one or more components for detecting objects external to the vehicle such as other road users (vehicles, pedestrians, bicyclists, etc.) obstacles in the roadway, traffic signals, signs, trees, buildings, etc. For example, the perception system 174 may include Lidars, sonar, radar, cameras, microphones and/or any other detection devices that generate and/or record data which may be processed by the computing devices of computing devices 110. In the case where the vehicle is a passenger vehicle such as a minivan or car, the vehicle may include Lidar, cameras, and/or other sensors mounted on or near the roof, fenders, bumpers or other convenient locations.

Figure 3A:
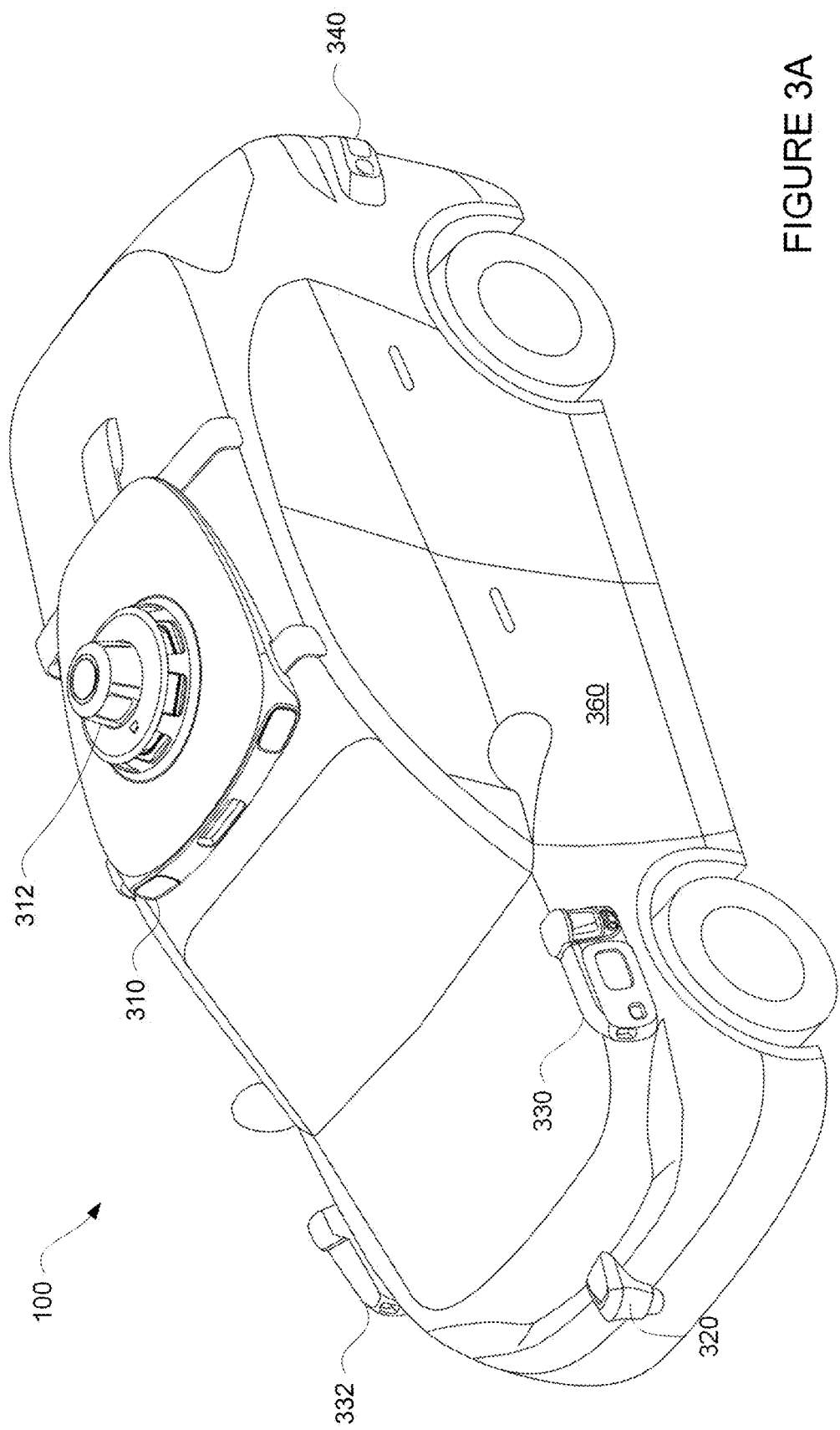
FIG. 3A-3B are example external views of a vehicle in accordance with aspects of the disclosure.
Figure 3B:
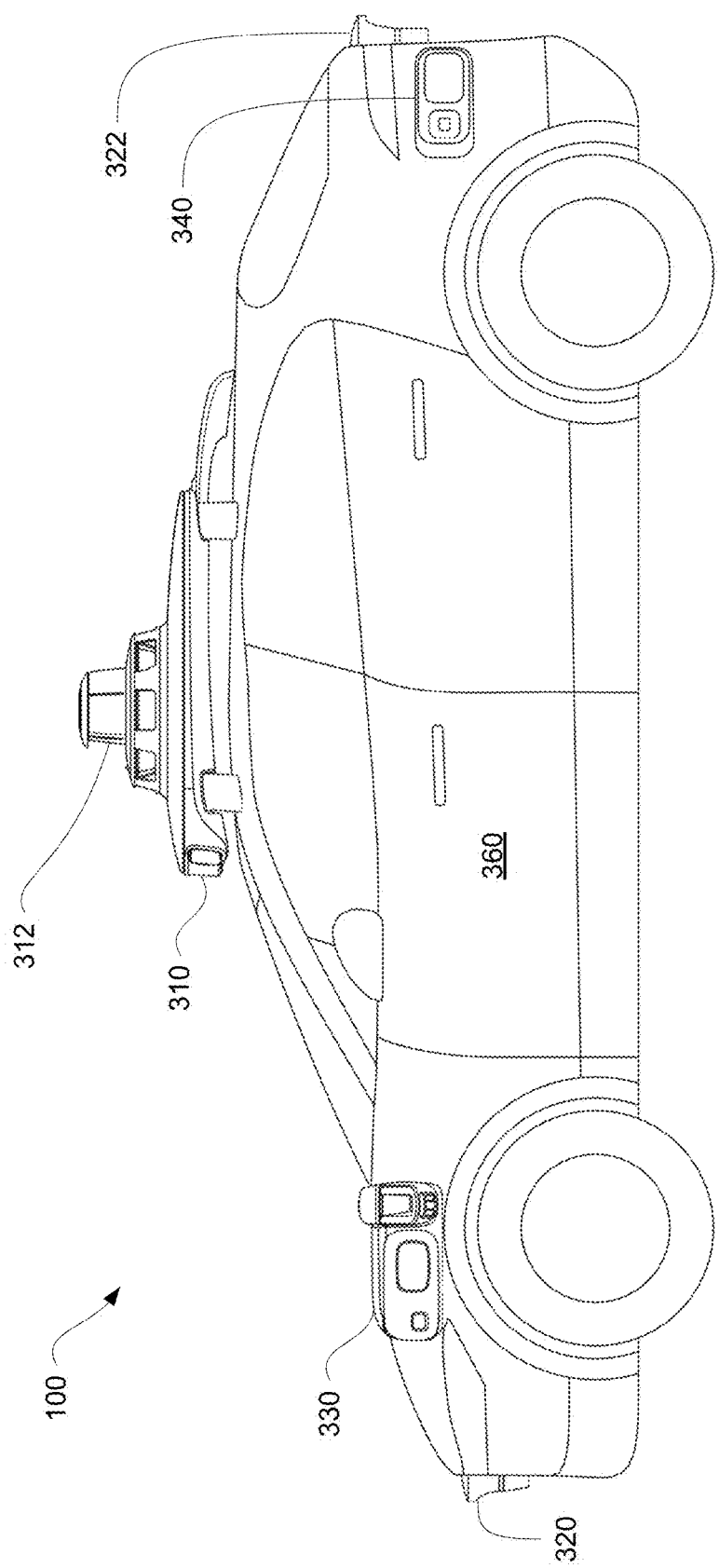

For instance, FIGS. 3A-3B are an example external views of autonomous vehicle 100. In this example, roof-top housing 310 and upper housing 312 may include a Lidar sensor as well as various cameras and radar units. Upper housing 312 may include any number of different shapes, such as domes, cylinders, "cake-top" shapes, etc. In addition, housing 320, 322 (shown in FIG. 3B) located at the front and rear ends of autonomous vehicle 100 and housings 330, 332 on the driver's and passenger's sides of the vehicle may each store a Lidar sensor and, in some instances, one or more cameras. For example, housing 330 is located in front of driver door 360. Autonomous vehicle 100 also includes a housing 340 for radar units and/or cameras located on the driver's side of the autonomous vehicle 100 proximate to the rear fender and rear bumper of autonomous vehicle 100. Another corresponding housing (not shown may also be arranged at the corresponding location on the passenger's side of the autonomous vehicle 100. Additional radar units and cameras (not shown) may be located at the front and rear ends of autonomous vehicle 100 and/or on other positions along the roof or roof-top housing 310.

Computing devices 110 may be capable of communicating with various components of the vehicle in order to control the movement of autonomous vehicle 100 according to primary vehicle control code of memory of computing devices 110. For example, returning to FIG. 1, computing devices 110 may include various computing devices in communication with various systems of autonomous vehicle 100, such as deceleration system 160, acceleration system 162, steering system 164, signaling system 166, planning system 168, routing system 170, positioning system 172, perception system 174, behavior modeling system 176, and power system 178 (i.e. the vehicle's engine or motor) in order to control the movement, speed, etc. of autonomous vehicle 100 in accordance with the instructions 134 of memory 130.

The various systems of the vehicle may function using autonomous vehicle control software in order to determine how to control the vehicle. As an example, a perception system software module of the perception system 174 may use sensor data generated by one or more sensors of an autonomous vehicle, such as cameras, Lidar sensors, radar units, sonar units, etc., to detect and identify objects and their characteristics. These characteristics may include location, type, heading, orientation, speed, acceleration, change in acceleration, size, shape, etc.

In some instances, characteristics may be input into a behavior prediction system software module of the behavior modeling system 176 which uses various behavior models based on object type to output one or more behavior predictions or predicted trajectories for a detected object to follow into the future (e.g. future behavior predictions or predicted future trajectories). In this regard, different models may be used for different types of objects, such as pedestrians, bicyclists, vehicles, etc. The behavior predictions or predicted trajectories may be a list of positions and orientations or headings (e.g. poses) as well as other predicted characteristics such as speed, acceleration or deceleration, rate of change of acceleration or deceleration, etc.

In other instances, the characteristics from the perception system 174 may be put into one or more detection system software modules, such as a traffic light detection system software module configured to detect the states of known traffic signals, construction zone detection system software module configured to detect construction zones from sensor data generated by the one or more sensors of the vehicle as well as an emergency vehicle detection system configured to detect emergency vehicles from sensor data generated by sensors of the vehicle. Each of these detection system software modules may use various models to output a likelihood of a construction zone or an object being an emergency vehicle.

Detected objects, predicted trajectories, various likelihoods from detection system software modules, the map information identifying the vehicle's environment, position information from the positioning system 170 identifying the location and orientation of the vehicle, a destination location or node for the vehicle as well as feedback from various other systems of the vehicle may be input into a planning system software module of the planning system 168. The planning system 168 may use this input to generate planned trajectories for the vehicle to follow for some brief period of time into the future based on a route generated by a routing module of the routing system 170. Each planned trajectory may provide a planned path and other instructions for an autonomous vehicle to follow for some brief period of time into the future, such as 10 seconds or more or less. In this regard, the trajectories may define the specific characteristics of acceleration, deceleration, speed, direction, etc. to allow the vehicle to follow the route towards reaching a destination location. A control system software module of computing devices 110 may be configured to control movement of the vehicle, for instance by controlling braking, acceleration and steering of the vehicle, in order to follow a trajectory.

The computing devices 110 may control the vehicle in one or more of the autonomous driving modes by controlling various components. For instance, by way of example, computing devices 110 may navigate the vehicle to a destination location completely autonomously using data from the detailed map information and planning system 168. Computing devices 110 may use the positioning system 170 to determine the vehicle's location and perception system 174 to detect and respond to objects when needed to reach the location safely. Again, in order to do so, computing device 110 and/or planning system 168 may generate trajectories and cause the vehicle to follow these trajectories, for instance, by causing the vehicle to accelerate (e.g., by supplying fuel or other energy to the engine or power system 178 by acceleration system 162), decelerate (e.g., by decreasing the fuel supplied to the engine or power system 178, changing gears, and/or by applying brakes by deceleration system 160), change direction (e.g., by turning the front or rear wheels of autonomous vehicle 100 by steering system 164), and signal such changes (e.g., by lighting turn signals) using the signaling system 166. Thus, the acceleration system 162 and deceleration system 160 may be a part of a drivetrain that includes various components between an engine of the vehicle and the wheels of the vehicle. Again, by controlling these systems, computing devices 110 may also control the drivetrain of the vehicle in order to maneuver the vehicle autonomously.

Figure 4:
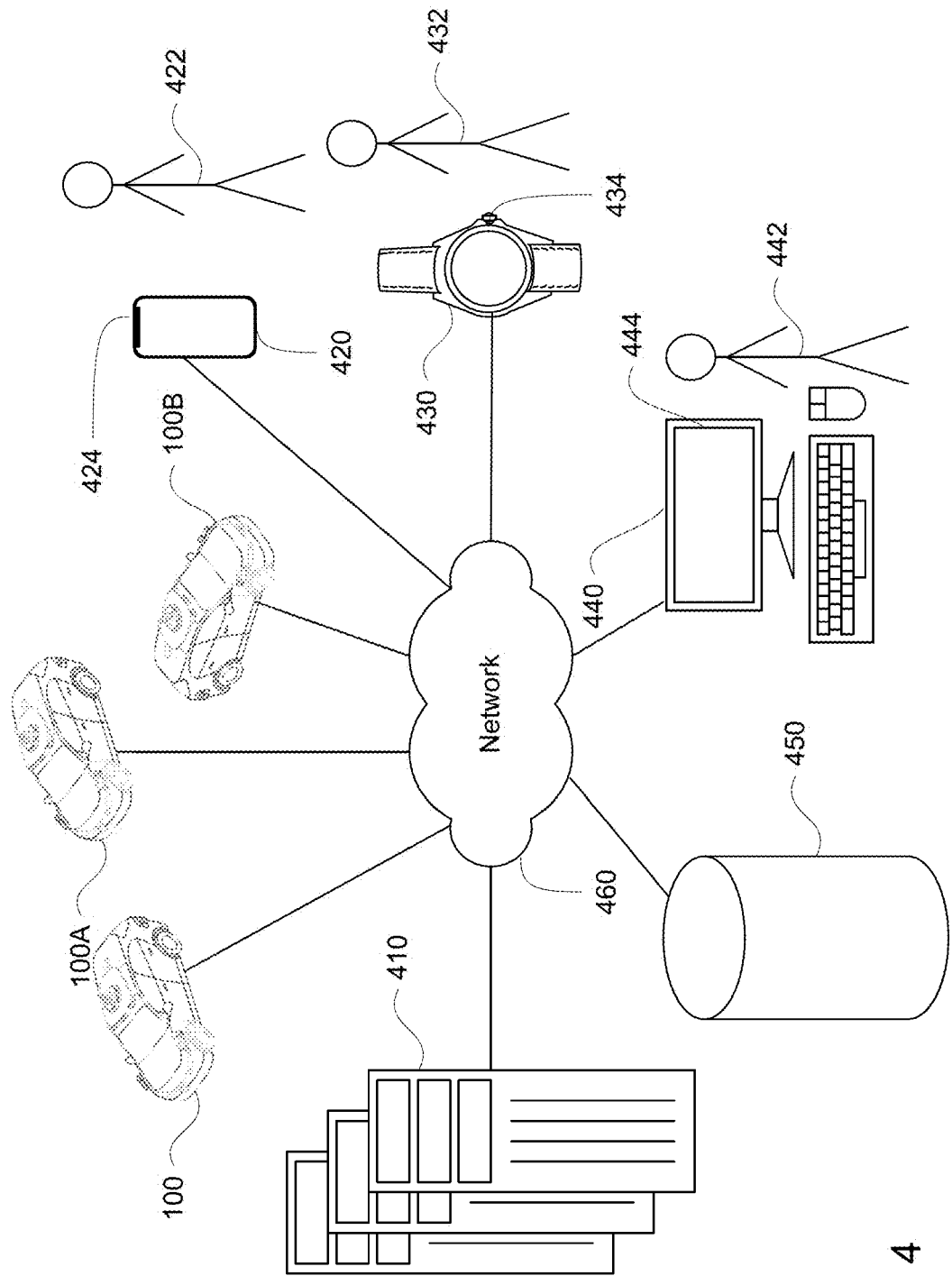
FIG. 4 is a pictorial diagram of an example system in accordance with aspects of the disclosure.
Figure 5:
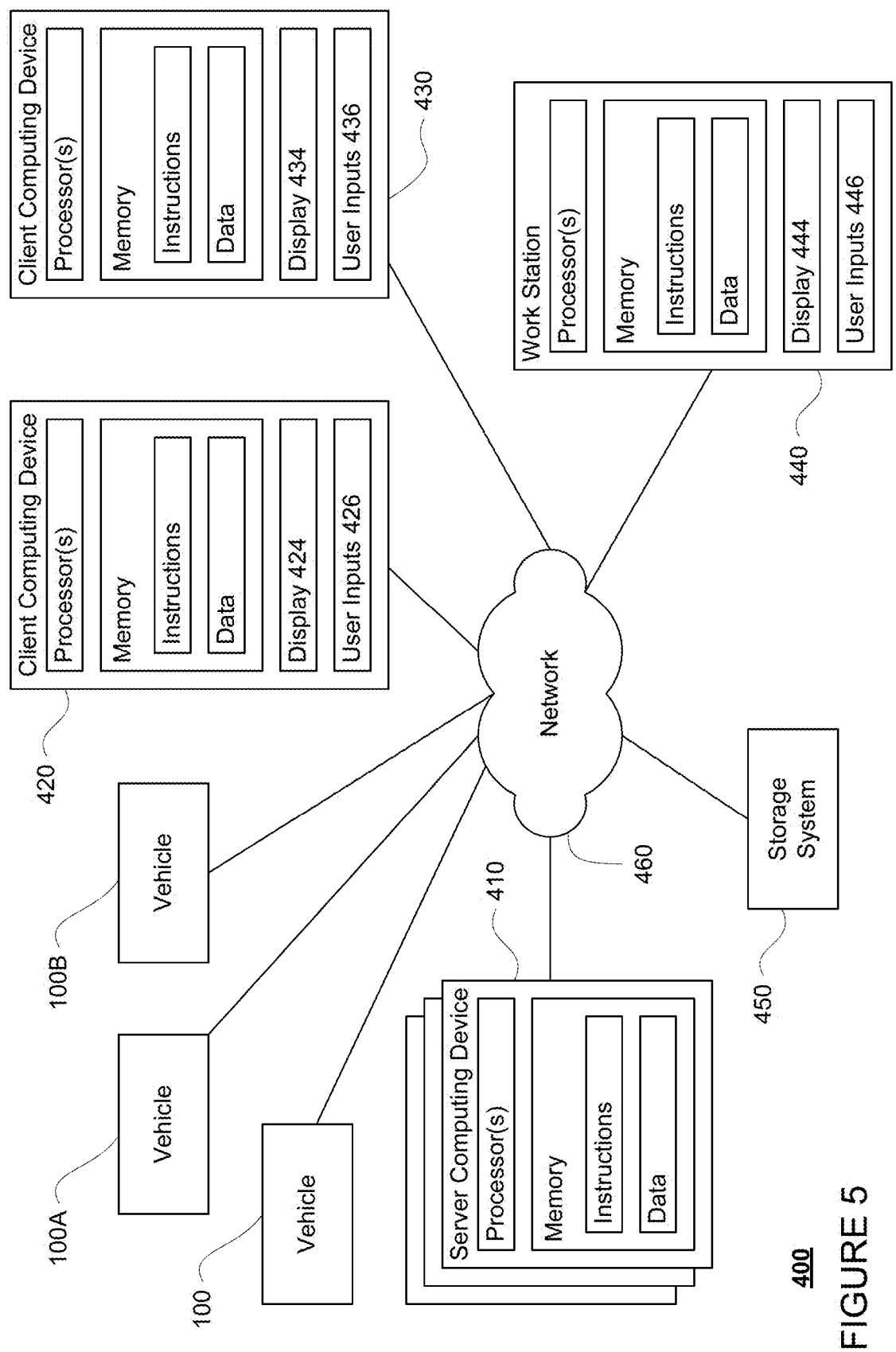
FIG. 5 is a functional diagram of the system of FIG. 4 in accordance with aspects of the disclosure.

Computing device 110 of autonomous vehicle 100 may also receive or transfer information to and from other computing devices, such as those computing devices that are a part of the transportation service as well as other computing devices. FIGS. 4 and 5 are pictorial and functional diagrams, respectively, of an example system 400 that includes a plurality of computing devices 410, 420, 430, 440 and a storage system 450 connected via a network 460. System 400 also includes autonomous vehicle 100A and autonomous vehicle 100B, which may be configured the same as or similarly to autonomous vehicle 100. Although only a few vehicles and computing devices are depicted for simplicity, a typical system may include significantly more.

As shown in FIG. 5, each of computing devices 410, 420, 430, 440 may include one or more processors, memory, data and instructions. Such processors, memories, data and instructions may be configured similarly to one or more processors 120, memory 130, data 132, and instructions 134 of computing device 110.

The network 460, and intervening graph nodes, may include various configurations and protocols including short range communication protocols such as Bluetooth, Bluetooth LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, one or more computing devices 410 may include one or more server computing devices having a plurality of computing devices, e.g., a load balanced server farm, that exchange information with different nodes of a network for the purpose of receiving, processing and transmitting the data to and from other computing devices. For instance, one or more computing devices 410 may include one or more server computing devices that are capable of communicating with computing device 110 of autonomous vehicle 100 or a similar computing device of autonomous vehicle 100A or autonomous vehicle 100B as well as computing devices 420, 430, 440 via the network 460. For example, autonomous vehicles 100, 100A, 100B, may be a part of a fleet of vehicles that can be dispatched by server computing devices to various locations. In this regard, the server computing devices 410 may function as a scheduling system which can be used to arrange trips for passengers by assigning and dispatching vehicles such as autonomous vehicles 100, 100A, 100B. These assignments may include scheduling trips to different locations in order to pick up and drop off those passengers. In this regard, the server computing devices 410 may operate using scheduling system software in order to manage the aforementioned autonomous vehicle scheduling and dispatching. In addition, the computing devices 410 may use network 460 to transmit and present information to a user, such as user 422, 432, 442 on a display, such as displays 424, 434, 444 of computing devices 420, 430, 440. In this regard, computing devices 420, 430, 440 may be considered client computing devices.

The server computing devices 410 may also track the status of the vehicles of the fleet using information that is periodically broadcast by the vehicles, specifically requested by the server computing devices provided by the vehicles, or using other methods of tracking the states of a fleet of autonomous vehicles. This periodically broadcast information may include messages providing all state information for a given vehicle. For instance state messages may be self-consistent and generated based on rules about packaging the messages from various systems of the vehicles. As an example, the messages may include vehicle pose (position/location and orientation), lane information (i.e., in what lane the vehicle is currently traveling), current route, estimated time of arrival at the vehicle's current destination location (e.g. how long to reach a pickup or destination location for a passenger), as well as other information, such as whether the vehicle is currently providing transportation services, experiencing any errors or problems, etc. In this regard, the server computing devices 410 may track the vehicle's progress with regard to its current route as well as estimate when the vehicle is likely to arrive at the vehicle's current destination location. This state information may be stored, for example, in the storage system 450.

As shown in FIG. 4, each client computing device 420, 430 may be a personal computing device intended for use by a user 422, 432 and have all of the components normally used in connection with a personal computing device including a one or more processors (e.g., a central processing unit (CPU)), memory (e.g., RAM and internal hard drives) storing data and instructions, a display such as displays 424, 434, 444 (e.g., a monitor having a screen, a touch-screen, a projector, a television, or other device that is operable to display information), and user input devices 426, 436, 446 (e.g., a mouse, keyboard, touchscreen or microphone). The client computing devices may also include a camera for recording video streams, speakers, a network interface device, and all of the components used for connecting these elements to one another.

Although the client computing devices 420, 430 may each comprise a full-sized personal computing device, they may alternatively comprise mobile computing devices capable of wirelessly exchanging data with a server over a network such as the Internet. By way of example only, client computing device 420 may be a mobile phone or a device such as a wireless-enabled PDA, a tablet PC, a wearable computing device or system, or a netbook that is capable of obtaining information via the Internet or other networks. In another example, client computing device 430 may be a wearable computing system, such as a wristwatch as shown in FIG. 4. As an example, the user may input information using a small keyboard, a keypad, microphone, using visual signals with a camera, or a touch screen. As yet another example, client computing device 440 may be a desktop computing system including a keyboard, mouse, camera and other input devices.

In some examples, client computing device 420 may be a mobile phone used by a passenger of an autonomous vehicle. In other words, user 422 may represent a passenger or a scheduler as discussed herein. In addition, client computing device 430 may represent a smart watch for a passenger of an autonomous vehicle. In other words, user 432 may represent a passenger or a scheduler as discussed herein. The client computing device 440 may represent a workstation for an operations person, for example, a remote assistance operator or other operations personnel who may provide remote assistance to an autonomous vehicle and/or a passenger. In other words, user 442 may represent an operator (e.g. operations person) of a transportation service utilizing the autonomous vehicles 100, 100A, 100B. Although only a few passengers, schedulers and operations persons are shown in FIGS. 4 and 5, any number of such passengers and remote assistance operators (as well as their respective client computing devices) may be included in a typical system.

As with memory 130, storage system 450 can be of any type of computerized storage capable of storing information accessible by the server computing devices 410, such as a hard-drive, memory card, ROM, RAM, DVD, CD-ROM, write-capable, and read-only memories. In addition, storage system 450 may include a distributed storage system where data is stored on a plurality of different storage devices which may be physically located at the same or different geographic locations. Storage system 450 may be connected to the computing devices via the network 460 as shown in FIGS. 4 and 5, and/or may be directly connected to or incorporated into any of computing devices 110, 410, 420, 430, 440, etc.

Storage system 450 may store various types of information as described in more detail below. This information may be retrieved or otherwise accessed by a server computing device, such as one or more server computing devices 410, in order to perform some or all of the features described herein. For instance, the storage system may store the tracked status information of the vehicles of the fleet of autonomous vehicles as discussed above as well as information about vehicles assigned to user's accounts for trips.

The storage system 450 may also store user account information. The account information may include credentials (e.g., a username and password as in the case of a traditional single-factor authentication as well as other types of credentials typically used in multi-factor authentications such as random identifiers, biometrics, etc.) that can be used to identify a user and/or the user's client computing device to the one or more server computing devices. In addition, account information may also include personal information such as the user's name, contact information, identifying information of the user's client computing device (or devices if multiple devices are used with the same user account), as well as trip information (e.g. scheduled, current and past trip information).

For instance, the storage system 450 may store tour trip information. In this regard, the storage system may store a plurality of pre-stored and pre-defined tours which can be accessed by the server computing devices 410. Each such tour may include a plurality of tour locations. For instance, a tour may be manually created by an operator hand-selecting from a plurality of locations within a service area of the transportation service. At least some of these tour locations may be stopping locations, that is, locations where the autonomous vehicle may stop to provide the passenger with the opportunity to exit the autonomous vehicle and explore the tour location and/or the area around the tour location. Thereafter, the passenger may return to the autonomous vehicle and continue the trip ("tour trip"). Other locations may be non-stopping locations or locations by or through which the autonomous vehicle will drive during a tour trip. In some instances, each of the tours may be assigned one or more interest labels or tags as discussed further below.

Figure 6:
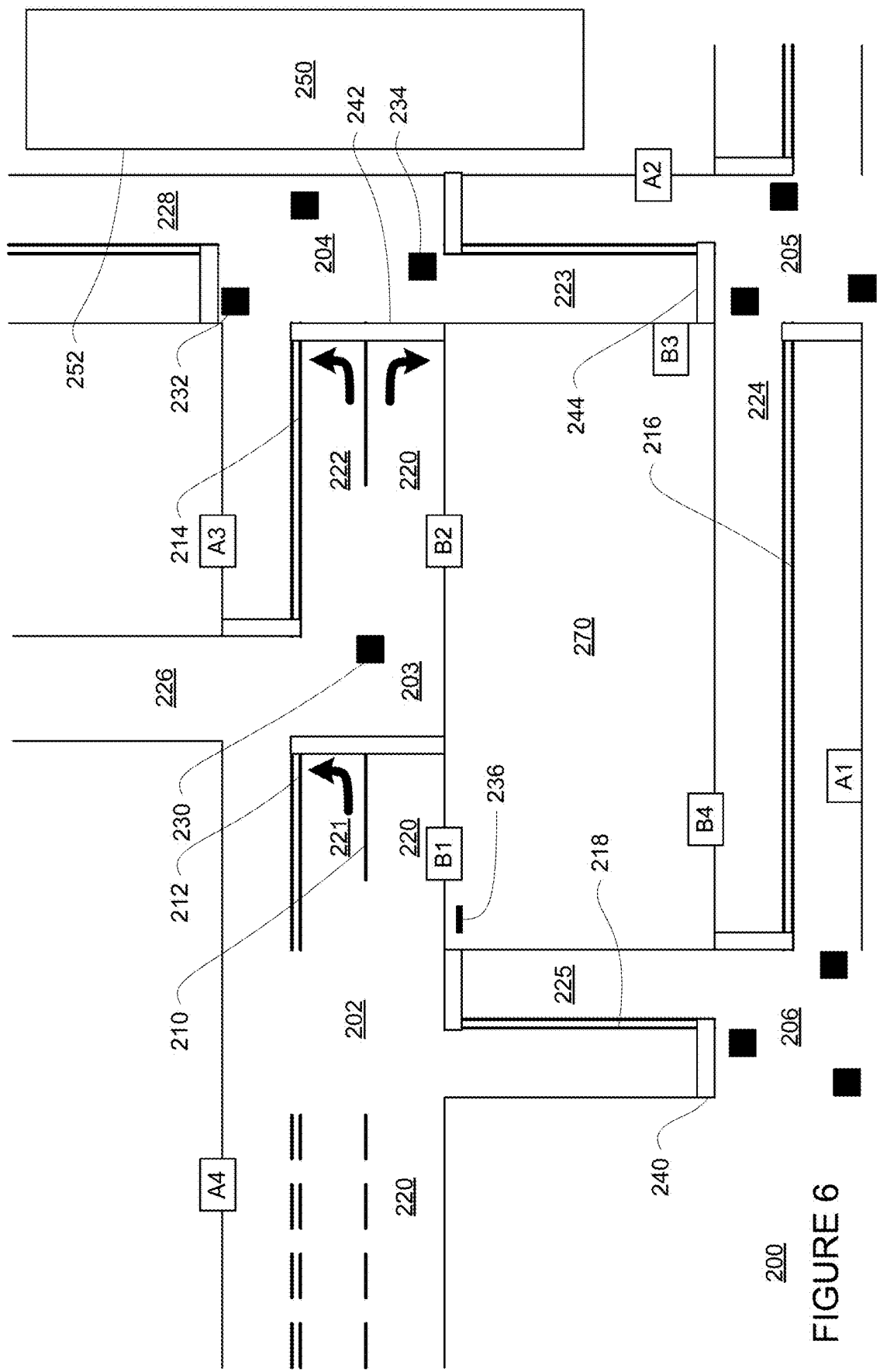
FIG. 6 is an example of map information and data in accordance with aspects of the disclosure.

FIG. 6 provides an example of map information 200 which may be stored in the storage system 450. In this example, the map information 200 includes tour locations for a tour trip A and a tour trip B. For example, tour trip A includes a plurality of tour locations A1, A2, A3, A4, and tour trip B includes a plurality of tour locations B1, B2, B3, B4. Although only 2 tour trips are depicted, the storage system may store any number of additional tour trips and corresponding tour locations.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

Figure 13:
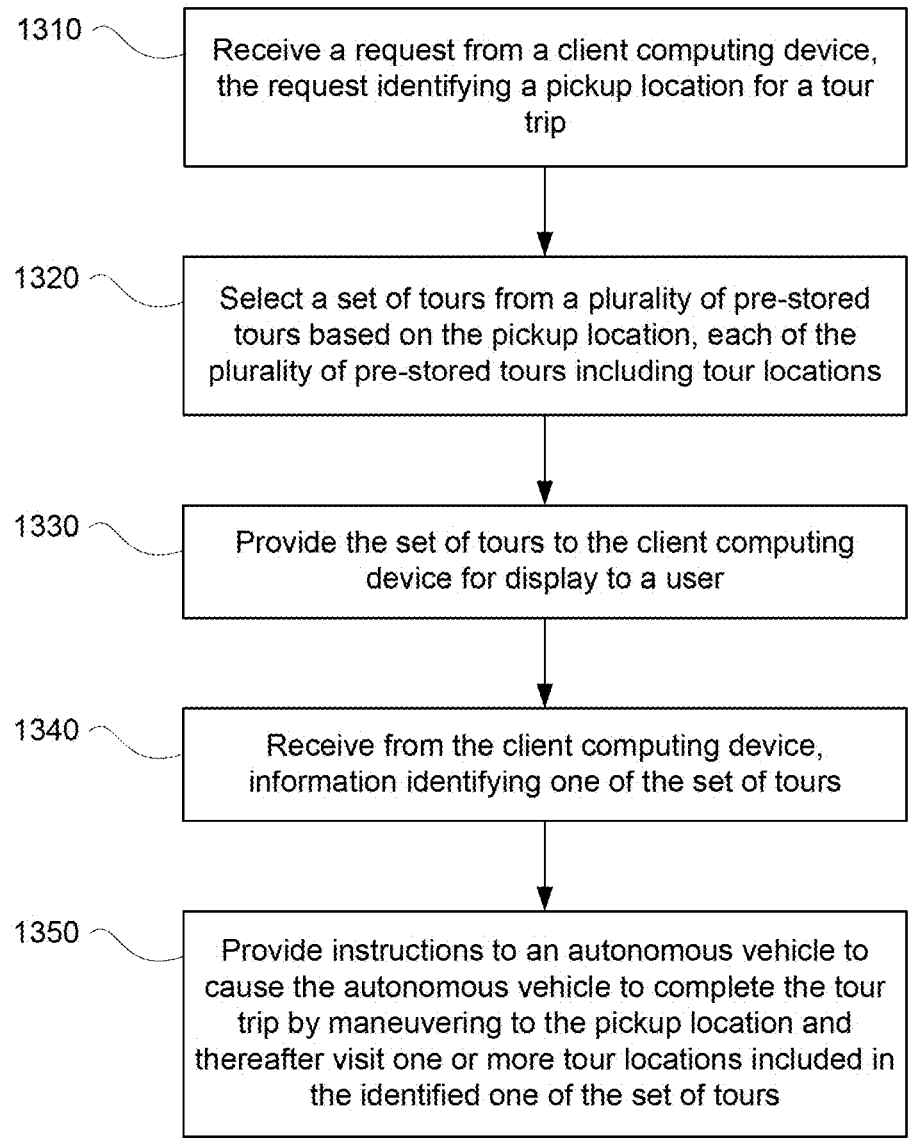
FIG. 13 is an example flow diagram in accordance with aspects of the disclosure.

FIG. 13 provides an example flow diagram 1300 for providing a tour trip, which may be performed by one or more processors, such as the one or more processors of the server computing devices 410. In this example, at block 1310, a request identifying a pickup location for a tour trip is from a client computing device.

In one aspect, a user may download an application for requesting a vehicle to a client computing device. For example, users 422 and 432 may download the application via a link in an email, directly from a website, or an application store to client computing devices 420 and 430.

For example, a client computing device may transmit a request for the application over the network 460, for example, to one or more server computing devices 410, and in response, receive the application. The application may then be installed locally at the client computing device.

To arrange a tour trip, a user, such as user 422, may first use a client computing device, such as client computing device 420, to arrange a tour trip. For instance, the user 422 may access an application of the transportation service and view an option to arrange a tour trip. In response, the client computing device 420 may send a request to a server computing device identifying at least a pickup location (e.g. a current location of the client computing device) and in some instances a different drop off destination.

The user may also specify or otherwise provide a pickup location at which a vehicle can pick up the user. As an example, a pickup location can be defaulted to a current location of the passenger's client computing device, but may also be a recent, suggested, or saved location near the current location associated with the user's account. The user may enter an address or other location information, tap a location on a map or select a location from a list in order to identify a pickup location. For instance, the client computing device 420 by way of the application may send its current location, such as a GPS location, and/or a name, address or other identifier for the pickup location to the one or more server computing devices 410 via network 460. In this regard, the user may share his or her current location (or other information such as accelerometer or gyroscope information generated by such devices at the client computing device) with the server computing devices 410 when using the application and/or requesting a vehicle for a trip.

Figure 7:
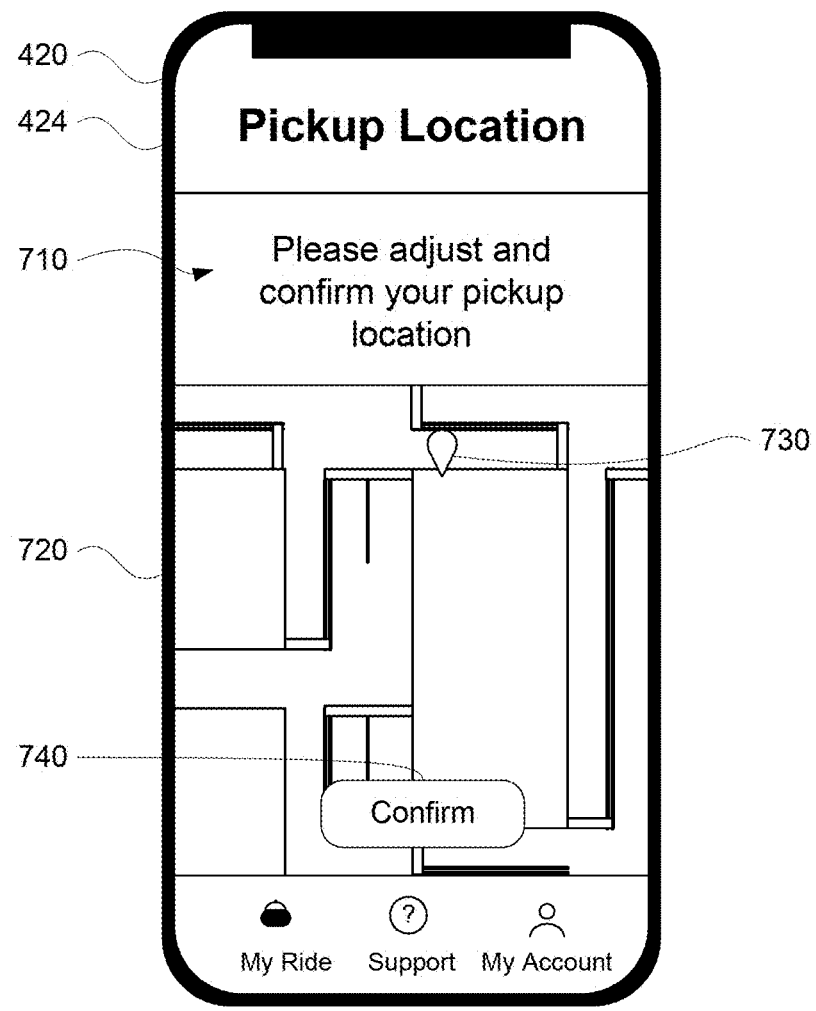
FIG. 7 is an example of a client computing device and a displayed request in accordance with aspects of the disclosure.

FIG. 7 represents an example of a request 710 displayed on display 424 of client computing device 420. The request asks the user (e.g. user 422) to identify a pickup location. Marker 730 represents the current location of the client computing device 420 with respect to map information 720. This map information may have been provided by the server computing devices 410 to the client computing device for display to the user, based on the location of the client computing device 410. In this example, the user may adjust the pickup location by moving (e.g. tapping, holding, and sliding) the marker to a new location. Once the user is satisfied, the user may select an option 740 to confirm the pickup location. Once confirmed, the pickup location may be provided to the server computing devices 410 by the application via the network 460.

In some instances, the pickup location may be used as a default drop off location for the tour trip. In regard, if the user does not provide a different drop off destination, the server computing devices may simply identify the pickup location as a final destination for the tour trip. The pickup location and any final destination may then be provided by the client computing device 420 to the server computing devices 410 by the application via the network 460 with a request for a tour trip.

Figure 8:
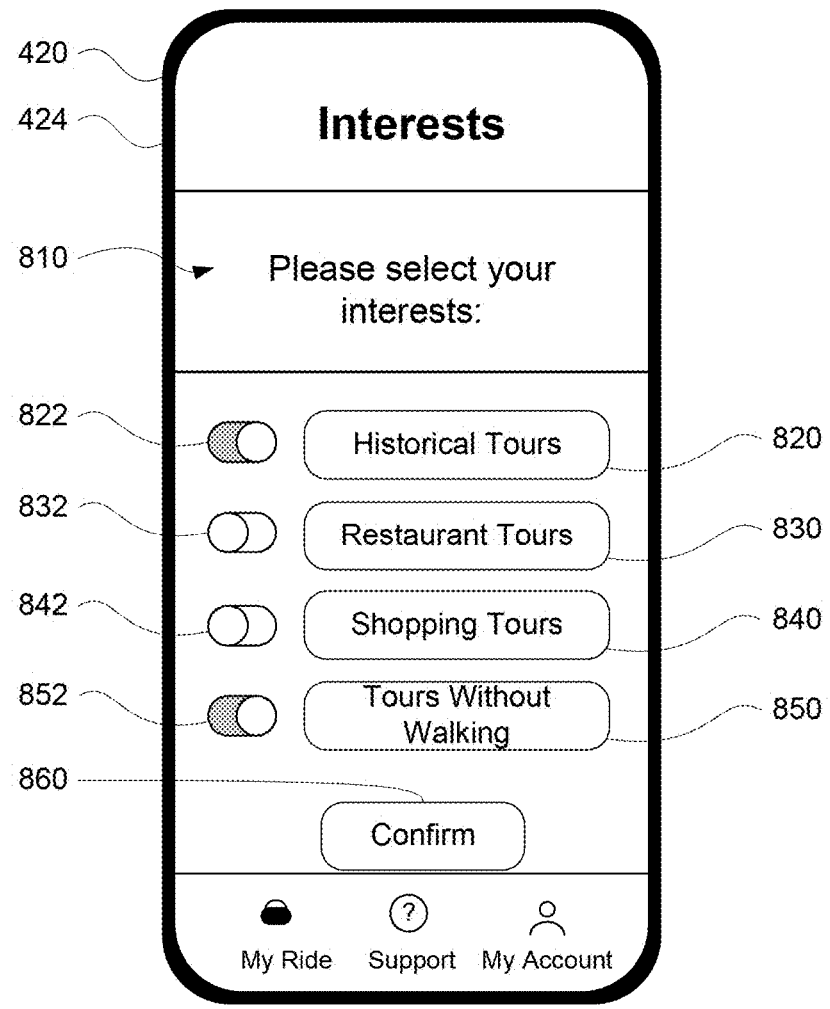
FIG. 8 is an example of a client computing device and a displayed request in accordance with aspects of the disclosure.

In some instances, the user may also select one or more of a plurality of pre-defined interests. For instance, such interests may include "historical tours", "restaurant tours", "food tours", "shopping tours", "tours with longer walks", "tours without walking" "tours with shorter walks", etc. FIG. 8 represents an example of a request 810 displayed on display 424 of client computing device 420. The request asks the user (e.g. user 422) to identify one or more pre-defined interests, including interests 820, 830, 840, 850. Although only a few interests are depicted, any number of interests may be displayed or otherwise provided to the user as options. In this example, the user can tap and toggle corresponding toggle switches 822, 832, 842, 852, though other selection or identification methods may also be used. In this example, toggle switches 822, 852 are depicted as active, and toggle switches 832, 842 are depicted as inactive. Once the user is satisfied with the user's selection of interests, the user may select an option 860 to confirm the user's selection. Once confirmed, the interests may be provided to the server computing devices 410 by the application via the network 460.

In some instances, the user need not select interests at the time a tour trip is arranged, but rather in advance. For instance, the user may be prompted to select interests the first time the user opens the application or selects a tour option in the application. This information may also be provided to the server computing devices 410 with the request and may be used by the server computing devices with the pickup location to select one or more tours for the set having the same or similar interest labels.

Returning to FIG. 13, at block 1320, a set of tours is selected from a plurality of pre-stored tours based on the pickup location. Each of the plurality of pre-stored tours including tour locations. For instance, the server computing devices may identify a set of the tours using one or more of the features described above and may send each of the tours of the set to the client computing device. For example, the server computing devices may use the pickup location to provide a list of tours having tour locations that are proximate to the pickup location (e.g. within the same city, county, state, etc.). In this regard, the server computing devices may also provide information identifying each of the tour locations of the tours of the set of tours. If available, the server computing devices may also provide the route for each tour to the client computing device, an order of the tour locations, and/or tour length.

In some instances, the tours may be associated with information identifying when the tours can be taken. For instance, some tours may be less desirable at certain times of the day (e.g. because some tour locations may not be readily visible to the passenger), while other tours may not be appropriate due to the time of year (e.g. a leaf watching tour may not make sense in the winter), other tours may not be appropriate during certain times of day or days of the week (e.g. if businesses at the tour location are closed, if there is heavy traffic due to typical congestion patterns or a specific event like parade or sporting event, if there is a school that gets out, etc.). In this regard, the server computing devices may not suggest such tours during those seasons/days/times.

In some instances, the server computing devices may also use a routing system to plan a route using the tour locations, the pickup location, and the drop off location. In this regard, the server computing devices may discard certain tours or not include them in the set of tours if those tours would be too long or due to current or expected traffic conditions (i.e. the tour may require passing through a heavily congested area). In this regard, the routing may enable the server computing devices to identify a suggested order of the tour locations using known planning algorithms (e.g. such as those that attempt to solve the "Traveling Salesman" problem) to determine a fastest route or a route with other desired characteristics (i.e. avoid certain areas like school zones or high-congestion areas) for a tour trip. In some instances, the user may select or otherwise identify a routing preference (e.g. shortest travel time or shortest route geographically).

In addition, the server computing devices may use the route to estimate how long a tour trip may be expected to take or a tour trip length. This may be supplemented with estimates for how long it may take a person to reach a tour location from a stopping location of the vehicle (i.e. 5 minutes to walk to an entrance of a building and return to the vehicle) and/or information about how long people typically spend at certain of the tour locations. For example, referring to the examples of FIG. 6, tour trip A may be associated with a longer tour trip length than tour trip B. This may be based on an estimated driving time to reach all of the tour locations of tour trips A and B and/or how long the user is expected to spend at each of the tour locations of each of tour trips A and B (e.g. tour locations A1, A2, A3, A4 and tour locations B1, B2, B3, B4).

At block 1330, the set of tours may be provided to the client computing device for display to a user. For instance, the server computing devices may send the set of tours to the client computing device 420. Thereafter, the set of tours may be displayed to the user in order to enable the user to browse available tours. In this regard, the user may be able to view a list of the tour locations and if received, a route for an associated tour trip, order of tour locations, and an estimated tour trip length.

Figure 9:
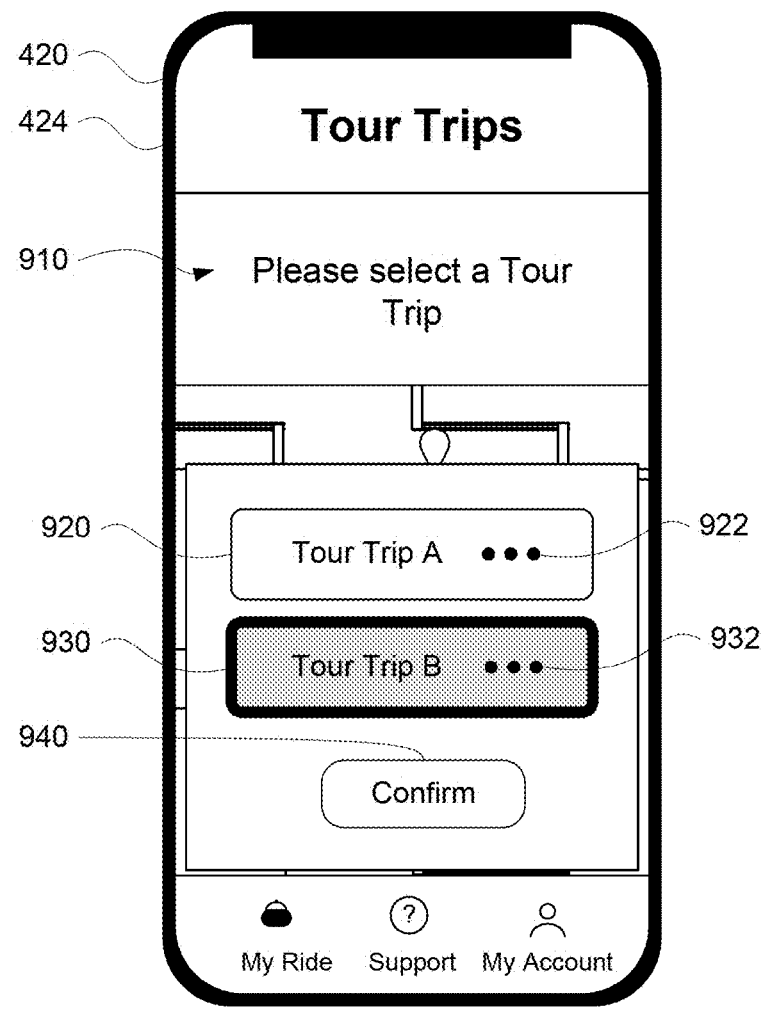
FIG. 9 is an example of a client computing device and a displayed request in accordance with aspects of the disclosure.

FIG. 9 represents an example of a request 910 displayed on display 424 of client computing device 420. The request asks the user (e.g. user 422) to select a tour trip from a set or list of available tour trips. In this example the set of tours includes an option 920 to select tour trip A and an option 930 to select tour trip B. In this example, the set of tours is provided as an overlay over the map information 720, though this information may alternatively be provided as its own page. As shown, the user has selected tour trip B via option 930 (shown as highlighted). Although not show, the interface may also allow users to sort or reorder available tours based on cost, category (e.g. labels), length of time spent in an autonomous vehicle, length of time expected to be spent at tour locations, or overall tour length.

Once the user is satisfied with the user's selection of a tour trip, the user may select an option 940 to confirm the user's selection. Once confirmed, the identity of the selected tour trip (here tour trip B) may be provided to the server computing devices 410 by the application via the network 460.

Figure 10:
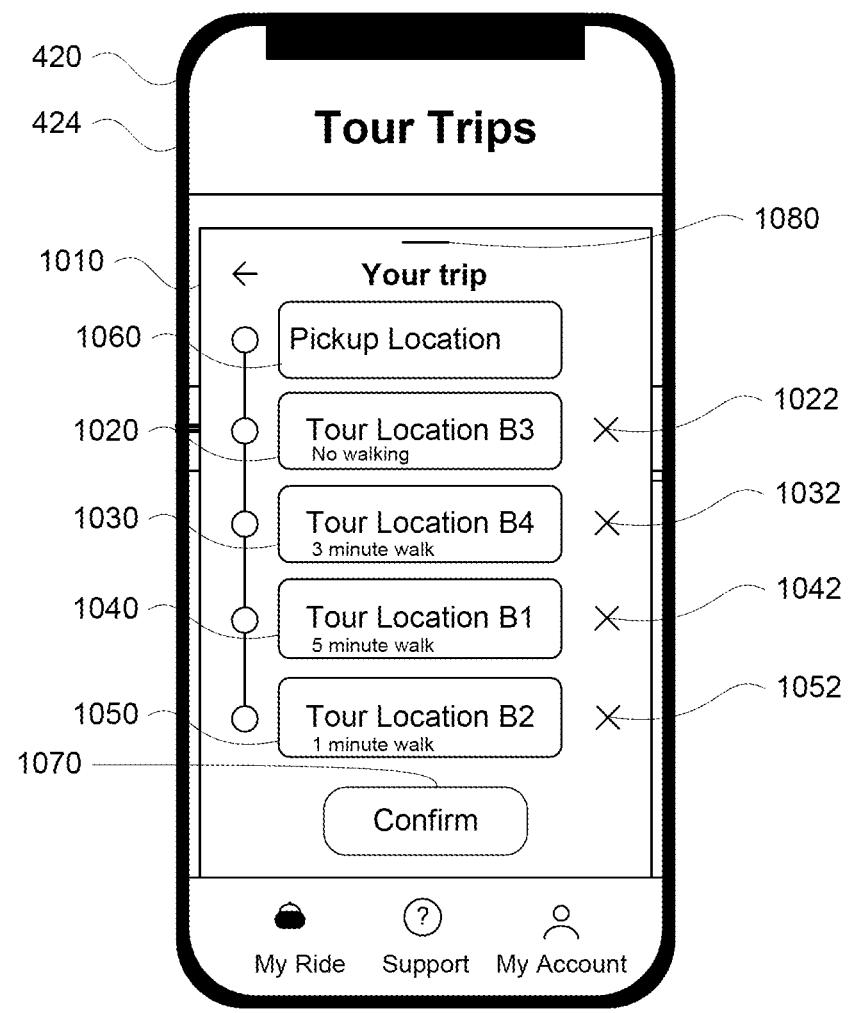
FIG. 10 is an example of a client computing device and displayed information in accordance with aspects of the disclosure.

FIG. 10 represents an example additional information 1010 for the tour trip B displayed on display 424 of client computing device 420. For instance, referring to FIG. 9, the user may select (e.g. tap) on the ellipses 922, 932 to view additional information about tour trip A and tour trip B. In the example, the user may have selected ellipses 932 in order to view additional information about the tour trip B. In this example, the additional information is provided as an overlay over the map information 720, though this information may alternatively be provided as its own page. As shown, tour trip B includes details 1020 for tour location B3, details 1030 for tour location B4, details 1040 for tour location B1, and details 1050 for tour location B2. In this regard, the order of the details indicates the order of the tour locations for tour trip B if the user were to be picked up at the pickup location (e.g. the pickup location specified in FIG. 7).

The server computing devices 410 may also provide additional information about the tours, for instance by providing the aforementioned labels. In this regard, certain information such as whether a tour includes a lot of walking, a little bit of walking or no walking may be displayed to the users. For example, referring to FIG. 10, details 1020 indicate that tour location B3 has no walking (e.g. this may simply be a tour location through or by which the autonomous vehicle will drive during the tour trip without the user exiting the autonomous vehicle). Details 1030 indicate that there will be (approximately) 3 minutes of walking to reach the tour location B4 once the user has exited the autonomous vehicle. Details 1040 indicate that there will be (approximately) 5 minutes of walking to reach the tour location B1 once the user has exited the autonomous vehicle. Details 1050 indicate that there will be (approximately) 1 minute (or rather very little to almost no) walking to reach the tour location B2 once the user has exited the autonomous vehicle. The additional information also provides the user with information 1060 the identification of the pickup location for reference.

In some instances, the user may be able to "edit" the tour, for instance, by removing or deleting tour locations. In response, the server computing devices may be provided an updated route, order of tour locations, and/or tour length. This may be especially useful if the user has only a limited amount of time to take a tour. The user may then use the client computing device to select a tour. For example, referring to FIG. 10, adjacent to details 1020, 1030, 1040, 1050, there are "x" options 1022, 1032, 1042, 1052 which may allow the user to delete or remove a tour location from the tour trip B. In this regard, the "x" options may be used to edit a tour trip. Once the user is satisfied with the tour locations, the user may select an option 1070 to confirm the user's edits.

Figure 11:
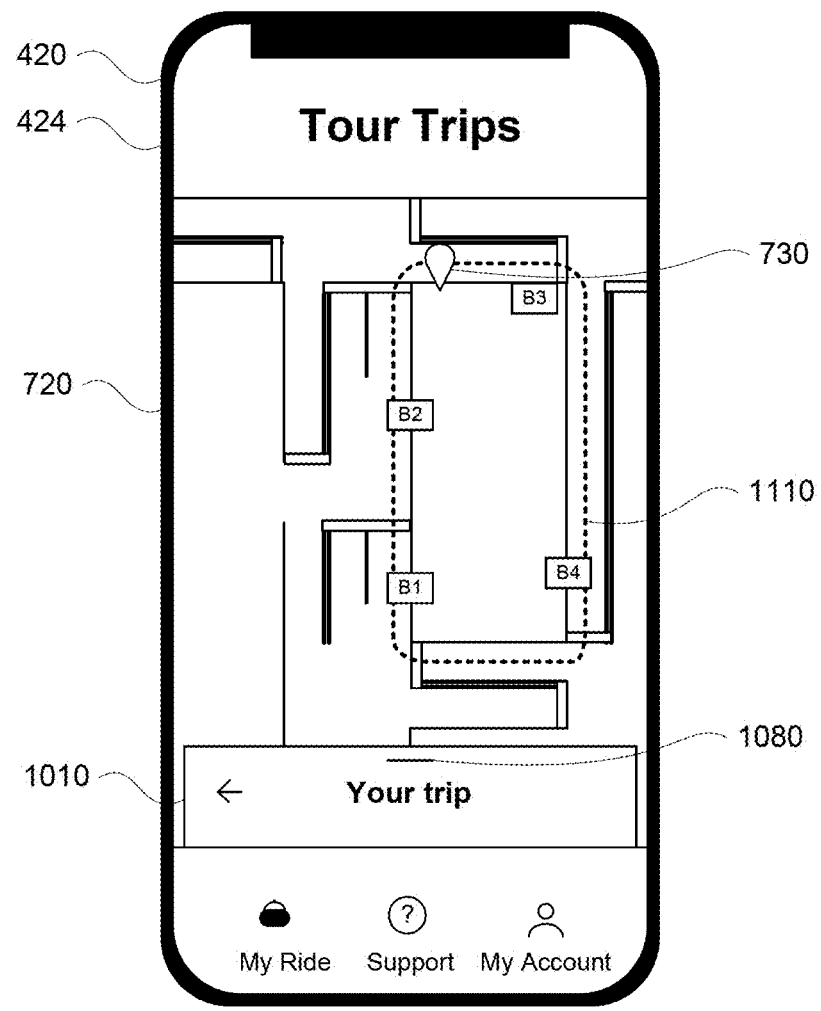
FIG. 11 is an example of a client computing device and displayed information in accordance with aspects of the disclosure.

In addition, by swiping on the bar option 1080, the user may reduce the size of the additional information 1010 in order to better view the map information 720. For example, by turning to FIG. 11, the additional information 1010 has been reduced, and the user is able to better view the map information 720. In this example, the display 424 also provides information about the relative locations to the tour locations B1, B2, B3, B4 with respect to the pickup location identified by the marker 730. The display 424 also includes information identifying a potential route 1110 for an autonomous vehicle starting at the pickup location and following a trip which would take the user from the pickup location to the tour location B3, thereafter to the tour location B4, thereafter to the tour location B1, thereafter to the tour location B2, and finally return the user to the pickup location. In some instances, instead of a "round-trip" tour trip which returns the user back to the pickup location, the user may request to make one of the tour locations the user's final destination Returning to FIG. 13, at block 1340, information identifying one of the set of tours is received from the client computing device. Once the user 422 has selected a tour trip, this may cause the client computing device to send information to the server computing devices 410 identifying the tour (and any edits, if applicable). In some instances, in response to receiving the pickup location and identified tour, the server computing devices 410, may request the user to confirm the trip (e.g. confirm the details of the trip). For example, the user may confirm the selection of tour trip B (and any edits) by selecting the option 940 to confirm the user's selection.

At block 1350, instructions are provided to an autonomous vehicle to cause the autonomous vehicle to complete the tour trip by maneuvering to the pickup location and thereafter visit one or more tour locations included in the identified one of the set of tours. For instance, (if requested) once confirmation is received from the client computing device 420, the server computing devices 410 may dispatch an autonomous vehicle to pick up the user 422 and complete the tour trip.

Figure 12:
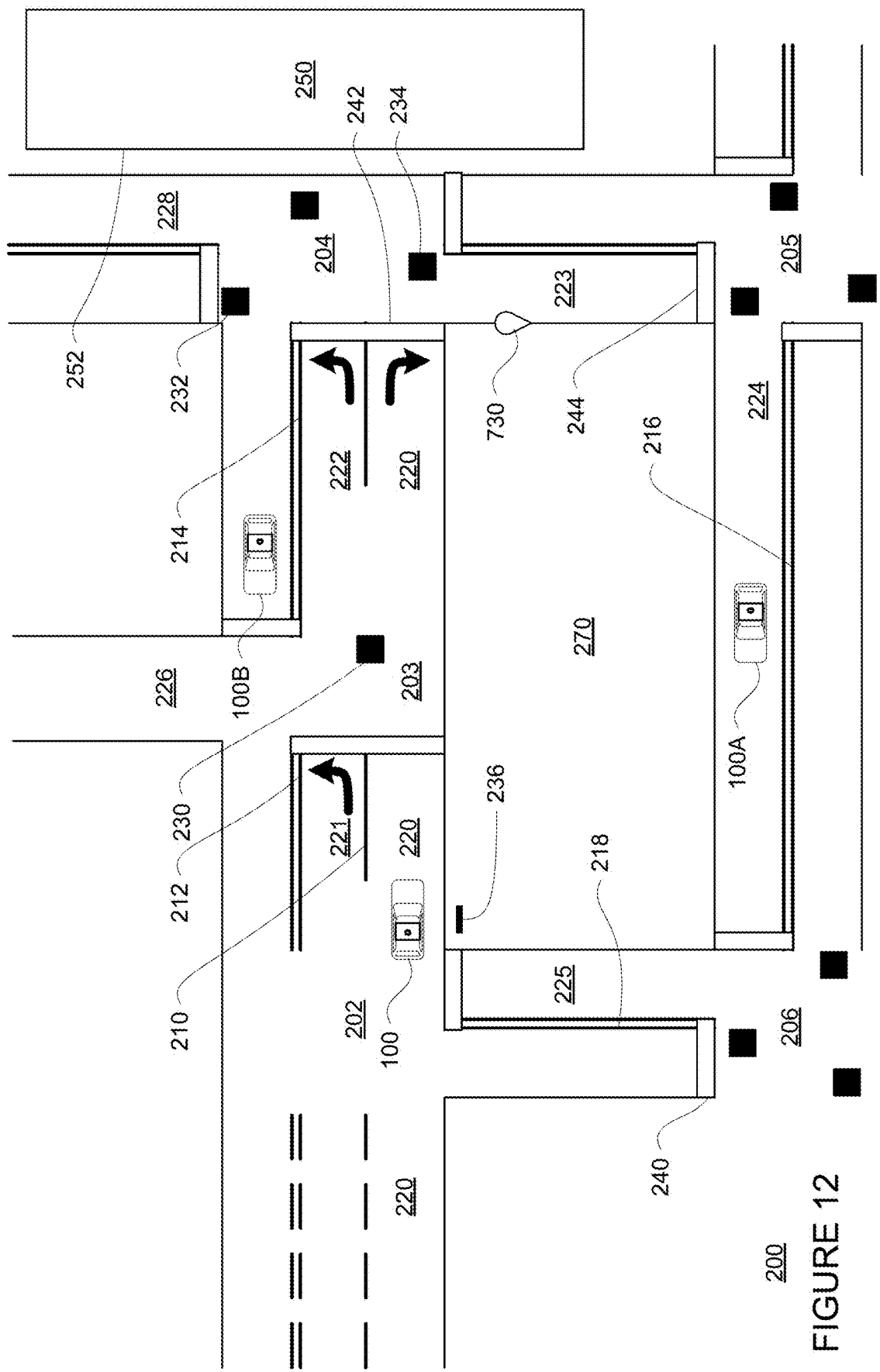
FIG. 12 is an example of map information and data in accordance with aspects of the disclosure.

To do so, the server computing devices 410 may first select an autonomous vehicle, for instance based on proximity to the pickup location and/or availability, and assign the autonomous vehicle to the user for the trip. For example, as indicated above, the server computing devices 410 may receive status updates from the autonomous vehicles 100, 100A, 100B indicating whether and when they are available to provide trip services as well as their location. In this regard, FIG. 12 includes the pickup location, represented by marker 730, the various locations of autonomous vehicles 100, 100A, 100B as well as their availability. The server computing devices 410 may determine that the autonomous vehicle 100 is available and closest to the location of the passenger (user 422).

The server computing devices 410 may then send dispatching instructions to the autonomous vehicle 100 in order to cause the autonomous vehicle to complete the tour trip by maneuvering to the pickup location and thereafter visiting any tour locations included in that tour trip. The dispatching instructions may include the tour locations of the selected tour as well as information identifying whether each of the tour locations is a stopping location or a non-stopping location. In addition, the server computing devices may provide information to the autonomous vehicle identifying a final destination. This final destination may either be the pickup location or a different drop off location if identified by the user.

Once the autonomous vehicle 100 is assigned to the trip, the autonomous vehicle may control itself to the pickup location in order to authenticate and pick up the user 422 and to complete the tour trip. This may include stopping to pick up the user (now a passenger), driving to and/or stop at each of the tour locations (depending upon whether those tour locations are stopping locations or non-stopping locations), and returning the passenger to the pickup location or the final destination (if provided by the user).

Although the examples above relate to a user arranging a tour trip using a client computing device, a tour trip may be arranged in a similar manner using the user inputs (e.g. a touch screen or other user input) at the autonomous vehicle. For example, a user may request an autonomous vehicle using the application as described above. This may send a signal to the server computing devices 410 which, in turn, assign an autonomous vehicle to the user and/or the user's trip. Once the autonomous vehicle 100 is assigned to the trip, the autonomous vehicle may control itself to the pickup location in order to authenticate and pick up the user 422. Once the user has entered the vehicle, the user may use the user input 150 and/or display 152 to input the information described above (with the exception of the pickup location) in order to request a tour trip. In this regard, the requesting of a tour trip may occur similarly to the examples above.

Figure 14:
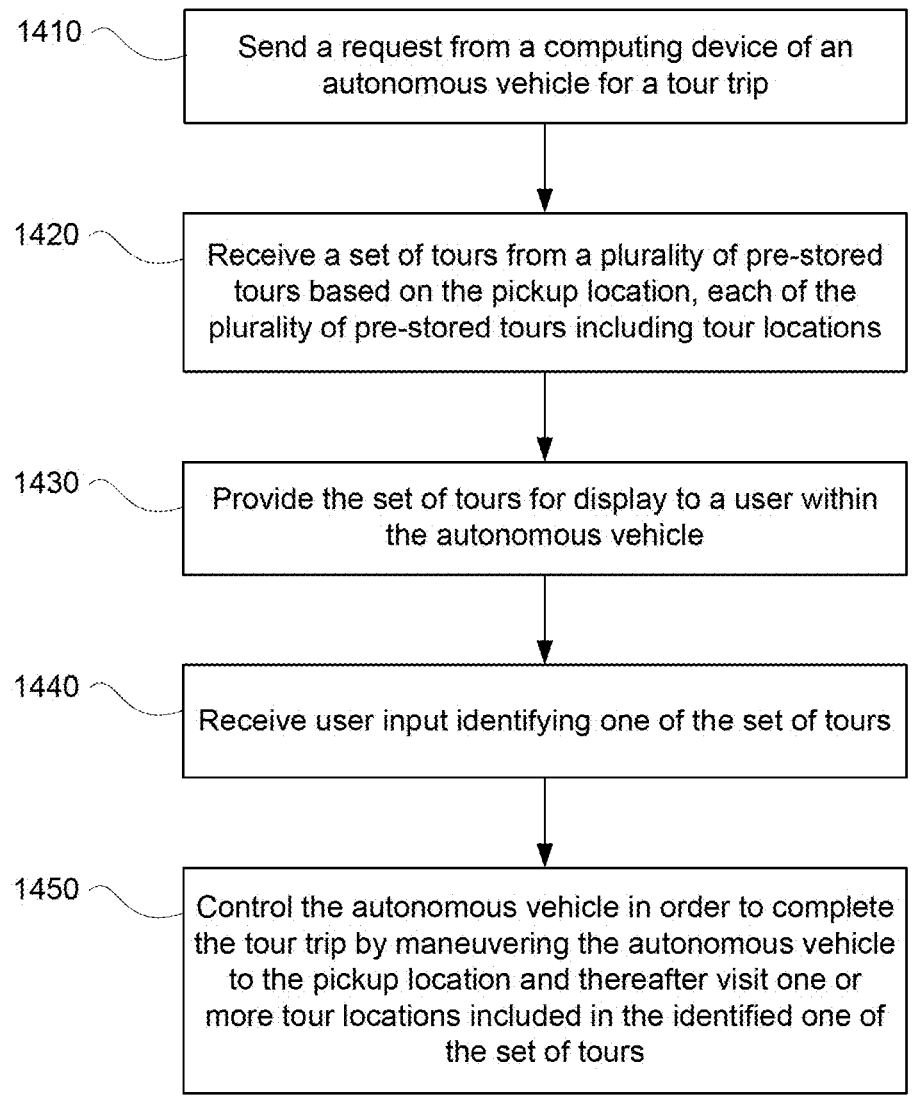
FIG. 14 is an example flow diagram in accordance with aspects of the disclosure.

However, rather than the client computing device 120 sending to and receiving information from the server computing devices 410, the computing devices 110 may send to and receive such information from the server computing devices in accordance with the examples above. FIG. 14 provides an example flow diagram 1400 for providing a tour trip, which may be performed by one or more processors, such as the one or more processors of the computing devices 110 of the autonomous vehicle 100. In this example, at block 1410 a request from a computing device of an autonomous vehicle for a tour trip is sent. In this regard, rather than the client computing device sending a request via the application to the server computing devices 410, the computing devices 110 may send a request to the server computing devices 410, for instance via the network 460. The request may include the location of the autonomous vehicle. In this regard, the computing devices 110 may send the autonomous vehicle's current location, such as a GPS location, to server computing devices 410 via network 460. As in the instances described above, the user may also select one or more of a plurality of pre-defined interests. In this regard, the user may view information similar to that depicted in FIG. 8 on the display 152 of the autonomous vehicle. As described above, in some instances, the user need not select interests at the time a tour trip is arranged, but rather in advance.

At block 1420, a set of tours is received. Each of the set of tours includes tour locations. As in the example above, the server computing devices may identify a set of the tours using one or more of the features described above as well as the current location of the autonomous vehicle and may send each of the tours of the set to the client computing device. For example, the server computing devices may use the current location of the autonomous vehicle (e.g. with the user inside) to provide a list of tours having tour locations that are proximate to the current location of the autonomous vehicle (e.g. within the same city, county, state, etc.). In this regard, the server computing devices may also provide information identifying each of the tour locations of the tours of the set of tours. If available, the server computing devices may also provide the route for each tour to the client computing device, an order of the tour locations, and/or tour length. This information may be sent by the server computing devices to the computing devices 110.

As in the instances described above, the tours may be associated with information identifying when the tours can be taken as such the server computing devices may not suggest such tours during those seasons/days/times as described above. Again, as in the instances described above, the server computing devices may also use a routing system to plan a route using the tour locations, the pickup location, and the drop off location. Again, the server computing devices may discard certain tours or not include them in the set of tours if those tours would be too long or due to current or expected traffic conditions, identify a suggested order of tour locations using know planning algorithms to determine a fastest route or a route with other desired characteristics for a tour trip, allow the user to select or otherwise identify a routing preference via the user inputs 150 of the autonomous vehicle, and use the route to estimate how long a tour trip may be expected to take or a tour trip length as described above.

At block 1430, the set of tours are provided for display to a user within the autonomous vehicle. For instance, the server computing devices may send the set of tours to the client computing devices 110. Thereafter, the set of tours may be displayed to the user in order to enable the user to browse available tours for instance on display 152 of the autonomous vehicle. As such, the user may view information similar to that depicted in FIGS. 9, 10 and 11 on the display 152 of the autonomous vehicle. In this regard, the user may be able to view a list of the tour locations and if received, a route for an associated tour trip, order of tour locations, and an estimated tour trip length as well as labels. In addition, as with the instances described above, the user may be able to "edit" the tour, for instance, by removing or deleting tour locations. In response, the computing devices 110 and/or server computing devices may be provided an updated route, order of tour locations, and/or tour length. This may be especially useful if the user has only a limited amount of time to take a tour. The user may then use the computing device 110 to select a tour as described above with regard to the example of FIG. 10. Once the user is satisfied with the tour locations, the user may select an option, corresponding to option 1070, to confirm the user's edits.

At block 1440, user input identifying one of the set of tours is received. Once the user is satisfied with the user's selection of a tour trip and any edits, the user may select an option, corresponding to option 940 in the example of FIG. 9, in order to confirm the user's selection.

At block 1450, the autonomous vehicle is controlled in order to complete the tour trip by maneuvering the autonomous vehicle to the pickup location and thereafter visit one or more tour locations included in the identified one of the set of tours. Once the user has confirmed the tour trip, rather than the server computing devices 410 sending instructions to the autonomous vehicle to cause the autonomous vehicle to complete the tour trip, the autonomous vehicle may simply do so automatically by maneuvering from the pickup location to visit one or more tour locations included in the identified one of the set of tours.

In either instance (e.g. using a client computing device or a user input of the autonomous vehicle to arrange a tour trip), if the autonomous vehicle stops at one or more of the tour locations, the passenger may be provided with the opportunity to exit the autonomous vehicle and explore the tour location and/or the area around the tour location. Thereafter, the passenger may return to the autonomous vehicle and continue the tour trip.

In some instances, if the passenger exits the autonomous vehicle, the autonomous vehicle could also pick the passenger up at a different location to continue a tour. For example, if the passenger exits the autonomous vehicle at one area of a park in order to tour the park and walks to some other part of the park, the autonomous vehicle could pick up the passenger at that other location in order to continue the tour. For instance, the autonomous vehicle 100 and/or the server computing devices 410 may determine that the location of the user's client computing device is not at the previous drop off location (e.g. tour location) and may provide a notification on the user's client computing device offering to move the pickup location (to continue the tour trip) to the current location of the user's client computing device. In some instances, a notification may also recommend that the user do this in some locations (e.g. the park example discussed above), or drop off the user at a transportation location (e.g. a cable car, bus, train, ferry, etc.) and tell the user to take the transportation to another location to meet the autonomous vehicle for the next pick up during the tour trip.

The dispatching information and/or information input by a passenger of the autonomous vehicle in order to request a tour trip may further include information which may cause the autonomous vehicle 100 to enable additional features for passengers during the tour trip which may not otherwise be available on other types of trips. For instance, during a tour trip, a user may be provided with an option on a display of an autonomous vehicle to edit the trip, for instance, by removing tour locations similar to the example described above with regard to FIG. 10. By doing so, the autonomous vehicle 100's computing devices 110 may reroute the autonomous vehicle 100 to skip that tour location and/or potentially change the order of any remaining tour locations of the tour trip.

As another instance, the autonomous vehicle 100 may display notifications or cues to the passenger to suggest where to look to see a tour location or some other location (e.g. "If you look to the left right now, you will see X"). These notifications could be triggered based on the location of the autonomous vehicle and known locations (e.g. GPS coordinates) for interesting places and triggered automatically by the autonomous vehicle's computing devices when the autonomous vehicle is within a certain distance of the coordinates. In some instances, the autonomous vehicle's sensors may be used to detect certain landmarks, and inform the passenger when such landmarks are visible based on the current conditions. For example, if it is a particularly foggy day the Golden Gate Bridge might not be visible from farther away so the autonomous vehicle could delay providing a notification announcing it to the user. When the autonomous vehicle's cameras are able to detect the Golden Gate Bridge as the autonomous vehicle gets closer, the autonomous vehicle could then provide a notification announce to the user when/where to look at the correct time. In some instances, additional information may be provided to the passenger's client computing device so that they can learn more about the tour location or some other location such as a link to a website, text and image summary, video, etc.

As another instance, during the tour trip, the autonomous vehicle may display videos associated with the tour locations of the tour trip. These videos may start before or end when the autonomous vehicle reaches the location. In some instances, live traffic and road conditions may be used to exactly line up the video start/end times so the video ends precisely as the autonomous vehicle arrives at the tour location. In addition, the autonomous vehicle may display maps of the tour locations during the tour trip. These may be especially useful if the passenger plans to exit the autonomous vehicle and explore a tour location. To facilitate this, when the tour trip is created, the server computing devices may send the assigned vehicle all the materials to use during the trip (either directly sending maps/images/videos or links for the car to fetch/download the content itself).

In addition, certain photo opportunities may be provided. This may involve, for example, surfacing an option on a display to enable the passenger to stop the vehicle to capture a photo of a location either by using the passenger's own device or by capturing a photo from a camera of the autonomous vehicle's perception system and automatically sending the photo to the client computing device of the passenger. In some instances, the passenger may be able to exit the autonomous vehicle to capture the photo and may even allow the passenger to take a "selfie" using the cameras of the autonomous vehicle. For instance, a user may use an application on the user's client computing device in order to send a message to the autonomous vehicle (either directly or via the server computing devices) indicating that the user is ready for a photo to be taken. Alternatively, the autonomous vehicle's perception system could monitor the user and take a photo a few seconds after it recognizes a certain gesture or movement by the user (e.g. thumbs up, or wave, etc.).

In some instances, the autonomous vehicle may not actually need to stop to provide a photo opportunity. Rather, the autonomous vehicle may be controlled in order to optimize it's positioning for capturing a photo of a tour location. In this regard, the autonomous vehicle may display a notification that there is an upcoming or current photo opportunity location for the passenger to capture a photo of a tour location, again either by using the passenger's own device or by capturing a photo from a camera of the autonomous vehicle's perception system and automatically sending the photo to the client computing device of the passenger. These photo opportunity locations may be determined in advance (e.g. by a person) and stored in the map information and accessed during the routing and trajectory planning of the autonomous vehicle.

In some instances, the tours provided by the server computing devices to the client computing device may be even further personalized for the user. For instance, the user's past ride history with the autonomous vehicle server may be used to identify tours with overlapping interests. For instance, if a user visits a location corresponding to a tour location of a tour, that tour may be included in the set. In addition or alternatively, labels associated with that tour may be used to select other tours that may be of interest to the user. For example, if a user typically visits a certain restaurant, the server computing devices may suggest a tour including that restaurant or restaurants which serve similar cuisine.

In other instances, the server computing devices may delete or remove one or more tour locations from a tour or route around certain locations. For instance, rather than not suggesting a tour because of congestion in a certain area along the route, the server computing devices may simply remove one or more tour locations from that tour in order to avoid the certain area before including it in the set.

The server computing devices may adjust the availability of tours based on current demand for the transportation service. For instance, if there is high demand for other types of trips (e.g. single drop off and destination), the server computing devices may, in response to the request, provide information to the client computing device which causes a notification or other information to be displayed indicating that tours are not currently available. In other instances, the server computing devices may send push notifications to client computing devices of users currently using the application to suggest tours when demand for other types of trips is light.

In some instances, the tours may be updated and revised over time based on data collected from users and passengers. For instance, tours that are rarely or never selected by users may be discarded or flagged for revisions. In other instances, users or passengers may provide feedback on a tour before or after it has been completed. This again may be used to discard or flag tours for revisions. In other instances, tours that are most often selected may be included in sets of tours more often. Similarly, users may identify their "favorite" tours, and an upvote and/or downvote system could be used to determine which of these tours should be included in a set of tours as described above.

Tour trips may also be broken up to be taken over multiple days or weeks. For example, a user may choose to take an 8-hour tour but do one portion on one day and another portion on another day. In this regard, a user may arrange tours in order to match the user's available time. With a traditional tour, this would not necessarily be possible to break up into smaller portions to be completed at different times.

Some tours may be associated with partnership data. For instance, some tours may have sponsors which may subsidize all or part of certain tours. For example, a business may sponsor tours which would bring passengers to a tour location corresponding to an area where the business is located. This information may be used in situations in which users are paying for the tour trips, for example, when determining and identifying the cost of a tour to the user before a tour is selected. In other examples, the partnership data may identify information which can be used by the user to purchase tickets for visiting one or more of the tour locations.

The features described herein may provide users (e.g. riders or passengers of autonomous vehicles) with personalized tours using an autonomous vehicle transportation service. However, by utilizing autonomous vehicles of a transportation service, users may be provided with a customized and potentially more comfortable option for touring a location. In addition, tour trips as described herein can be arranged on demand without any need for scheduling ahead of time or on a fixed schedule like most traditional tours.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only some of many possible embodiments. Further, the same reference numbers in different drawings can identify the same or similar elements.

The invention claimed is:

1. A method of arranging tour trips, the method comprising:
   receiving, by one or more processors, a request from a client computing device, the request identifying a pickup location for a tour trip provided by an autonomous vehicle;
   selecting, by the one or more processors, a set of tours from a plurality of pre-stored tours based on the pickup location;
   providing, by the one or more processors, the set of tours to the client computing device for display to a user;
   receiving, by the one or more processors, user input indicating that the user desires to view additional information about one of the set of tours;
   in response to the user input, providing, by the one or more processors, the additional information to the client computing device for display to the user, the additional information including an ordered set of tour location labels corresponding to a plurality of tour locations in the one of the set of tours, wherein an estimated walking time is displayed in each of the tour location labels along with an identity of a respective one of the plurality of tour locations, the estimated walking time indicating how much time will be needed for the user to walk to the tour location from a stopping location where the autonomous vehicle will stop to allow the user to exit the autonomous vehicle and thereafter return to the autonomous vehicle to complete the tour trip;
   receiving, by the one or more processors, from the client computing device, information confirming selection by the user of the one of the set of tours; and
   controlling, by the one or more processors, the autonomous vehicle to complete the tour trip by maneuvering to the pickup location and thereafter visit one or more of the plurality of tour locations included in the one of the set of tours.

2. The method of claim 1, wherein the one or more of the plurality of tour locations include a non-stopping location by or through which the autonomous vehicle will drive during the tour trip without stopping.

3. The method of claim 1, wherein each of the plurality of pre-stored tours is further associated with one or more interest labels, and the method further comprises, receiving information identifying one or more interests, and wherein selecting the set of tours is further based on the one or more interests and the one or more interest labels associated with each of the tours of the set of tours.

4. The method of claim 1, wherein at least some of the plurality of pre-stored tours are further associated with information identifying when such tours can be taken, and wherein selecting the set of tours is further based on the information identifying when such tours can be taken.

5. The method of claim 1, further comprising:
determining a route and order of tour locations for each given tour of the set of tours based on the pickup location and the tour locations associated with that given tour; and
providing the route and order of tour locations for the one of the set of tours to the autonomous vehicle.

6. The method of claim 5, further comprising:
receiving information identifying an edit to a given one of the tours of the set of tours;
determining an updated route for the given one of the set of tours; and
providing the updated route to the client computing device for display to the user.

7. The method of claim 1, further comprising:
determining a route for a given tour of the plurality of pre-stored tours based on the pickup location and the tour locations associated with the given tour; and
excluding the given tour from the set of tours based on characteristics of the route.

8. The method of claim 1, further comprising:
determining a route for each given tour of the set of tours based on the pickup location and the tour locations associated with the given tour;
estimating a total trip length for each given tour based on the route for that given tour and an estimate of how long a passenger is likely to spend at each tour location included in the given tour; and
providing the estimated total trip lengths to the client computing device for display to the user.

9. The method of claim 1, wherein each of the plurality of pre-stored tours is further associated with an interest label, and the method further comprises providing the interest labels associated with the tours of the set of tours to the client computing device for display to the user.

10. The method of claim 1, further comprising:
receiving feedback about the tour trip; and
adjusting a characteristic of one or more tours of the plurality of pre-stored tours based on the feedback.

11. The method of claim 1, wherein the autonomous vehicle is configured to provide notifications or cues to a passenger during the tour trip to suggest where to look to see a tour location included in the one of the set of tours.

12. A system for arranging tour trips, the system comprising one or more processors configured to:
receive a request from a client computing device, the request identifying a pickup location for a tour trip provided by an autonomous vehicle;
select a set of tours from a plurality of pre-stored tours based on the pickup location;
provide the set of tours to the client computing device for display to a user;
receive user input indicating that the user desires to view additional information about one of the set of tours;
in response to the user input, provide the additional information to the client computing device for display to the user, the additional information including an ordered set of tour location labels corresponding to a plurality of tour locations in the one of the set of tours, wherein an estimated walking time is displayed in each of the tour location labels along with an identity of a respective one of the plurality of tour locations, the estimated walking time indicating how much time will be needed for the user to walk to the tour location from a stopping location where the autonomous vehicle will stop to allow the user to exit the autonomous vehicle and thereafter return to the autonomous vehicle to complete the tour trip;
receive from the client computing device, information confirming selection by the user of the one of the set of tours; and
control the autonomous vehicle to complete the tour trip by maneuvering to the pickup location and thereafter visit one or more of the plurality of tour locations included in the one of the set of tours.

13. The system of claim 12, wherein the one or more of the plurality of tour locations include a non-stopping location by or through which the autonomous vehicle will drive during the tour trip without stopping.

14. The system of claim 12, wherein each of the plurality of pre-stored tours is further associated with one or more interest labels, and the one or more processors are further configured to, receive information identifying one or more interests, and to select the set of tours further based on the one or more interests and the one or more interest labels associated with each of the tours of the set of tours.

15. The system of claim 14, the one or more processors are further configured to:
receive information identifying an edit to a given one of the tours of the set of tours;
determine an updated route for the given one of the set of tours; and
provide the updated route to the client computing device for display to the user.

16. The system of claim 12, wherein each of the plurality of pre-stored tours is further associated with an interest label, and the one or more processors are further configured to provide the interest labels associated with the tours of the set of tours to the client computing device for display to the user.

17. The system of claim 12, wherein the one or more processors are further configured to:
receive feedback about the tour trip; and
adjust a characteristic of one or more tours of the plurality of pre-stored tours based on the feedback.

18. The system of claim 12, wherein the autonomous vehicle is configured to provide notifications or cues to a passenger during the tour trip to suggest where to look to see a tour location included in the one of the set of tours.

* * * * *

UNITED STATES PATENT AND TRADEMARK OFFICE
CERTIFICATE OF CORRECTION

PATENT NO. : 12,412,130 B1
APPLICATION NO. : 17/673418
DATED : September 9, 2025
INVENTOR(S) : Lauren Schwendimann et al.

Page 1 of 1

It is certified that error appears in the above-identified patent and that said Letters Patent is hereby corrected as shown below:

In the Claims

Claim 1, Column 24, Lines 44 and 45:
Now reads: "an ordered set of tour location labels" should read -- an ordered set of tour location display areas --

Claim 1, Column 24, Lines 47 and 48:
Now reads: "the tour location labels" should read -- the tour location display areas --

Claim 12, Column 26, Lines 7 and 8:
Now reads: "an ordered set of tour location labels" should read -- an ordered set of tour location display areas --

Claim 12, Column 26, Line 11:
Now reads: "the tour location labels" should read -- the tour location display areas --

Signed and Sealed this
Twenty-first Day of October, 2025

John A. Squires
*Director of the United States Patent and Trademark Office*